United States Patent
Han et al.

(10) Patent No.: US 12,477,050 B2
(45) Date of Patent: Nov. 18, 2025

(54) ELECTRONIC APPARATUS INCLUDING DISTANCE DETECTION SENSOR MODULE

(71) Applicant: SAMSUNG ELECTRONICS CO., LTD., Suwon-si (KR)

(72) Inventors: Jeongwoo Han, Suwon-si (KR); Johngy Lee, Suwon-si (KR); Kyungwan Park, Suwon-si (KR); Juhwan Lee, Suwon-si (KR); Jaeyoung Huh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1120 days.

(21) Appl. No.: 17/434,239

(22) PCT Filed: Jan. 29, 2020

(86) PCT No.: PCT/KR2020/001358
§ 371 (c)(1),
(2) Date: Aug. 26, 2021

(87) PCT Pub. No.: WO2020/204327
PCT Pub. Date: Oct. 8, 2020

(65) Prior Publication Data
US 2022/0155418 A1     May 19, 2022

(30) Foreign Application Priority Data
Apr. 4, 2019  (KR) .................. 10-2019-0039513

(51) Int. Cl.
*H04M 1/02*    (2006.01)
*G01S 7/481*   (2006.01)
(Continued)

(52) U.S. Cl.
CPC ........... *H04M 1/026* (2013.01); *G01S 7/4813* (2013.01); *H04M 1/0264* (2013.01);
(Continued)

(58) Field of Classification Search
CPC ..... G01S 7/4813; G01S 17/894; H04N 23/51; H04N 23/52; H04N 13/271; H04N 23/57;
(Continued)

(56) References Cited

U.S. PATENT DOCUMENTS 7,997,812 B2    8/2011  Kim
8,139,145 B2 *  3/2012  Ryu ....................... H04N 23/54
                                                      438/118
(Continued)

FOREIGN PATENT DOCUMENTS

CN    207382424         5/2018
CN    207382424 U   *   5/2018
(Continued)

OTHER PUBLICATIONS

International Search Report for PCT/KR2020/001358 mailed May 7, 2020, 4 pages.
(Continued)

*Primary Examiner* — Rockshana D Chowdhury
*Assistant Examiner* — Martin Antonio Asmat Uceda
(74) *Attorney, Agent, or Firm* — Nixon & Vanderhye P.C.

(57) ABSTRACT

According to various embodiments, an electronic apparatus may comprise: a housing including a front cover, a rear cover facing a direction opposite a direction of the front cover, and a side frame surrounding a space between the front cover and the rear cover; and a distance detection sensor module configured to detect a distance to an external object through the front cover from inside the space, wherein the distance detection sensor module may include: a substrate including a light emitting unit, a light receiving unit, a control circuit, and a ground layer; a module housing disposed on the substrate; a first shield can disposed in the module housing and electrically connected to the ground layer of the substrate; and a second shield can surrounding
(Continued)

at least a portion of the light emitting unit disposed in the first shield can and exposed through the first shield can, and in contact with at least a portion of the first shield can.

18 Claims, 22 Drawing Sheets

(51) Int. Cl.
*G01S 17/894* (2020.01)
*H04N 23/51* (2023.01)
*H04N 23/52* (2023.01)
*H05K 9/00* (2006.01)

(52) U.S. Cl.
CPC .......... *H04M 1/0266* (2013.01); *H04N 23/51* (2023.01); *H04N 23/52* (2023.01); *H05K 9/0024* (2013.01); *G01S 17/894* (2020.01); *H04M 2250/12* (2013.01)

(58) Field of Classification Search
CPC .. H04M 1/026; H04M 1/0264; H04M 1/0266; H04M 2250/12; H05K 9/0024
See application file for complete search history.

(56) References Cited

U.S. PATENT DOCUMENTS

| | | | |
|---|---|---|---|
| 8,487,256 B2 | 7/2013 | Kwong et al. | |
| 8,743,179 B2 * | 6/2014 | Ryu | G03B 30/00 |
| | | | 348/46 |
| 9,007,520 B2 * | 4/2015 | Azuma | G02B 7/09 |
| | | | 348/208.4 |
| 9,065,175 B2 * | 6/2015 | Corbin | H01Q 1/243 |
| 9,584,709 B2 * | 2/2017 | Garcia | H04N 23/57 |
| 9,794,459 B1 * | 10/2017 | Kim | G02B 15/142 |
| 9,930,229 B2 * | 3/2018 | Zhao | H05K 1/181 |
| 10,165,161 B2 * | 12/2018 | Wei | H04N 23/51 |
| 10,268,234 B2 * | 4/2019 | Fletcher | H04N 23/56 |
| 10,996,713 B2 * | 5/2021 | Pakula | H04N 23/51 |
| 11,128,787 B2 * | 9/2021 | Wang | H04N 23/45 |
| 11,496,658 B2 * | 11/2022 | Park | G02B 7/022 |
| 11,602,042 B2 * | 3/2023 | Odagiri | H05K 1/0224 |
| 11,982,863 B2 * | 5/2024 | Saito | H04N 23/57 |
| 12,298,531 B2 * | 5/2025 | Min | H04N 23/57 |
| 12,363,414 B2 * | 7/2025 | Park | G02B 5/0278 |
| 2005/0275748 A1 | 12/2005 | Takekuma et al. | |
| 2010/0134985 A1 | 6/2010 | Hsu | |
| 2013/0141541 A1 * | 6/2013 | Jung | G03B 30/00 |
| | | | 348/46 |
| 2016/0150133 A1 * | 5/2016 | Suzuki | H04N 23/51 |
| | | | 348/376 |
| 2017/0215305 A1 * | 7/2017 | Price | H01S 5/0215 |
| 2018/0367720 A1 * | 12/2018 | Lu | H04N 23/45 |
| 2019/0227255 A1 * | 7/2019 | Hu | G03B 3/10 |
| 2019/0243087 A1 * | 8/2019 | Osaka | G03B 3/10 |
| 2019/0273851 A1 * | 9/2019 | Dobashi | G02B 27/0018 |
| 2020/0100402 A1 * | 3/2020 | Schmitt | H05K 9/0037 |
| 2020/0212603 A1 * | 7/2020 | Lin | H05K 1/181 |
| 2023/0367135 A1 * | 11/2023 | Park | G03B 5/06 |

FOREIGN PATENT DOCUMENTS

| | | |
|---|---|---|
| JP | 2005-354545 | 12/2005 |
| KR | 10-2007-0067898 | 6/2007 |
| KR | 10-1263954 | 5/2013 |
| KR | 10-2014-0042907 | 4/2014 |
| KR | 101847075 B1 * | 4/2018 |

OTHER PUBLICATIONS

Written Opinion of the ISA for PCT/KR2020/001358 mailed May 7, 2020, 5 pages.
Korean Office Action issued Apr. 7, 2023 in corresponding Korean Patent Application No. 10-2019-0039513.

* cited by examiner

ELECTRONIC APPARATUS INCLUDING DISTANCE DETECTION SENSOR MODULE

CROSS-REFERENCE TO RELATED APPLICATIONS

This application is a national stage of International Application No. PCT/KR2020/001358 designating the United States, filed on Jan. 29, 2020, in the Korean Intellectual Property Receiving Office and claiming priority to Korean Patent Application No. 10-2019-0039513, filed on Apr. 4, 2019, in the Korean Intellectual Property Office, the disclosures of which are incorporated by reference herein in their entireties.

BACKGROUND

Field

The disclosure relates to an electronic device including a distance detection sensor module.

Description of Related Art

An electronic device may include one or more electrical structures that are disposed in the internal space thereof and connected to an external environment. These electrical structures may be not only designed to have a mounting structure that can prevent performance degradation due to mutual interference in the internal space of the electronic device, but also be designed in consideration of electromagnetic compatibility (EMC) to minimize electromagnetic interference (EMI) that may affect the performance of surrounding devices.

As the importance of three dimensional (3D) content functions (e.g., augmented reality (AR) and/or virtual reality (VR) functions) that can display images with a sense of depth increases, to obtain a 3D image with a sense of depth from an external object, an electronic device may include various sensor modules for detecting the distance to the external object. These distance detection sensor modules may include structured light sensor modules or time-of-flight (TOF) sensor modules (e.g., light time-of-flight method). Recently, TOF sensor modules, which are advantageous for detecting accurate information about the distance to an external object regardless of the separation distance to the external object, have been used.

Such a TOF sensor module may detect the distance to an external object using a time difference (or phase difference) in which light irradiated to the external object is reflected by the external object and returns. The TOF sensor module may be disposed in the internal space of the electronic device so as to recognize information about the distance to an external object through the front cover and/or rear cover. The TOF sensor module may include a light emitting unit (e.g., vertical cavity surface emitting laser (VCSEL)) for irradiating a laser light source to the outside (e.g., light emitting structure), and a light receiving unit (e.g., infrared camera) disposed near the light emitting unit to detect light that is irradiated from the light emitting unit and reflected back by an external object (e.g., light receiving structure). For example, the light emitting unit and the light receiving unit may be disposed side by side on one substrate, and may be controlled through a control circuit (e.g., driver IC). However, as the light emitting unit of the TOF sensor module is configured to operate high TX power in the form of a clock pulse, it may be vulnerable to noise. Such noise is expressed as electromagnetic interference (EMI) in the form of radiated emissions (RE), and may adversely affect the performance of external electronic devices in proximity. Moreover, such electromagnetic interference may also affect the performance of internal electrical structures (e.g., radiating performance of the antenna) of the electronic device.

SUMMARY

Embodiments of the disclosure provide an electronic device including a distance detection sensor module.

Embodiments of the disclosure provide an electronic device including a distance detection sensor module to which a noise shielding structure is applied.

Embodiments of the disclosure provide an electronic device including a distance detection sensor module that can prevent and/or reduce performance deterioration of nearby electronic devices by minimizing and/or reducing electromagnetic interference through a noise shielding structure.

According to various example embodiments, an electronic device may include: a housing including a front cover, a rear cover facing an opposite direction to the front cover, and a side frame surrounding a space between the front cover and the rear cover; and a distance detection sensor module disposed in the space and configured to detect a distance to an external object through the front cover, wherein the distance detection sensor module may include: a substrate that includes a light emitting unit including light emitting circuitry, a light receiving unit including light receiving circuitry, a control circuit, and a ground layer; a module housing disposed on the substrate; a first shield can disposed on the module housing and electrically connected to the ground layer of the substrate; and a second shield can disposed on the first shield can surrounding at least a portion of the light emitting unit exposed through the first shield can, and disposed to contact at least a portion of the first shield can. According to various example embodiments, an electronic device may include: a housing including a front cover, a rear cover facing a direction opposite the front cover, and a side frame surrounding the space between the front cover and the rear cover and including a conductive support extending toward the space and having a first opening formed therein; a camera assembly protruding toward the front cover through the first opening between the conductive support and the rear cover, and including a bracket, a distance detection sensor module disposed on the bracket configured to detect a distance to an external object through the front cover, and at least one camera module including a camera disposed on the bracket and extending to the front cover; and a display disposed between the conductive support and the front cover, wherein the distance detection sensor module may include: a substrate including a light emitting unit including light emitting circuitry, a light receiving unit including light receiving circuitry, a control circuit, and a ground layer; a module housing disposed on the substrate; a first shield can disposed on the module housing and electrically connected to the ground layer of the substrate; and a second shield can disposed on the first shield can, surrounding at least a portion of the light emitting unit exposed through the first shield can, and disposed to be in contact with at least a portion of the first shield can.

In various example embodiments of the disclosure, as multiple noise shielding structures are applied to the distance detection sensor module to minimize and/or reduce electromagnetic interference, it is possible to not only prevent and/or reduce performance degradation of nearby electronic devices but also prevent and/or reduce performance degradation of electrical structures disposed inside the electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar reference symbols may be used for the same or similar components.

DETAILED DESCRIPTION

Figure 1:
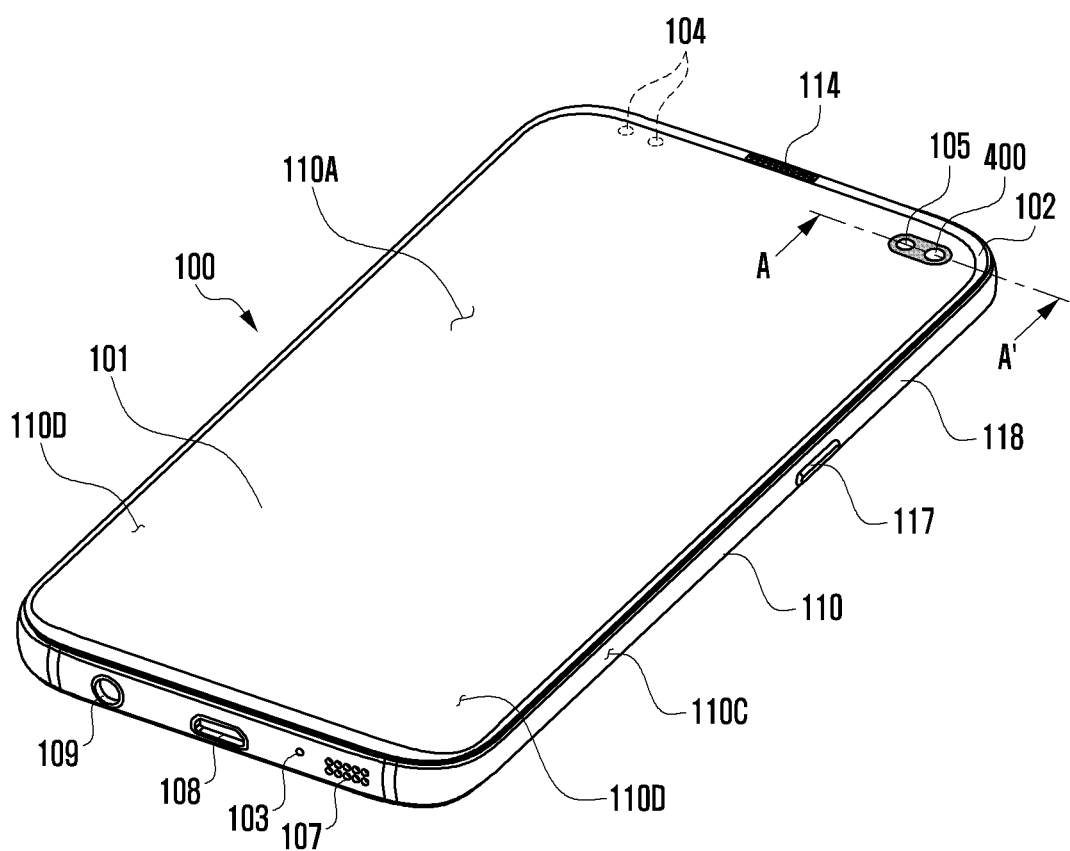
FIG. 1 is a front perspective view of a mobile electronic device according to various embodiments.
Figure 2:
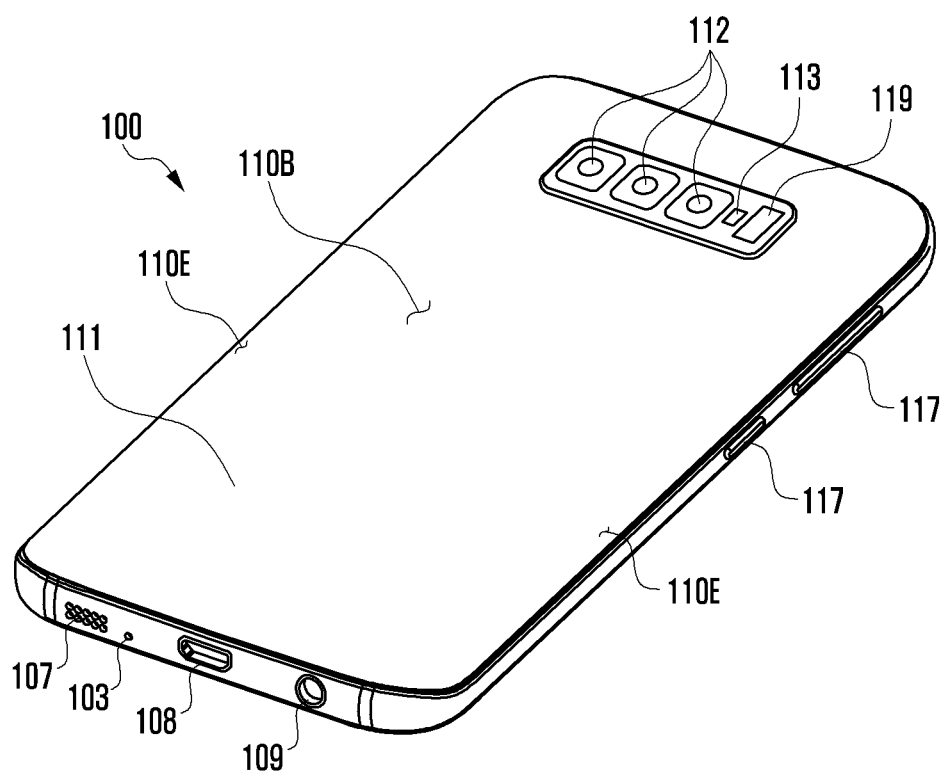
FIG. 2 is a rear perspective view of the electronic device in FIG. 1 according to various embodiments.

FIG. 1 is a front perspective view showing a front surface of a mobile electronic device according to various embodiments, and FIG. 2 is a rear perspective view showing a rear surface of the mobile electronic device shown in FIG. 1 according to various embodiments.

Referring to FIGS. 1 and 2, a mobile electronic device 100 may include a housing 110 that includes a first surface (or front surface) 110A, a second surface (or rear surface) 110B, and a lateral surface 110C that surrounds a space between the first surface 110A and the second surface 110B. The housing 110 may refer to a structure that forms a part of the first surface 110A, the second surface 110B, and the lateral surface 110C. The first surface 110A may be formed of a front plate 102 (e.g., a glass plate or polymer plate coated with a variety of coating layers) at least a part of which is substantially transparent. The second surface 110B may be formed of a rear plate 111 which is substantially opaque. The rear plate 111 may be formed of, for example, coated or colored glass, ceramic, polymer, metal (e.g., aluminum, stainless steel (STS), or magnesium), or any combination thereof. The lateral surface 110C may be formed of a lateral bezel structure (or "lateral member") 118 which is combined with the front plate 102 and the rear plate 111 and includes a metal and/or polymer. The rear plate 111 and the lateral bezel structure 118 may be integrally formed and may be of the same material (e.g., a metallic material such as aluminum).

The front plate 102 may include two first regions 110D disposed at long edges thereof, respectively, and bent and extended seamlessly from the first surface 110A toward the rear plate 111. Similarly, the rear plate 111 may include two second regions 110E disposed at long edges thereof, respectively, and bent and extended seamlessly from the second surface 110B toward the front plate 102. The front plate 102 (or the rear plate 111) may include only one of the first regions 110D (or of the second regions 110E). The first regions 110D or the second regions 110E may be omitted in part. When viewed from a lateral side of the mobile electronic device 100, the lateral bezel structure 118 may have a first thickness (or width) on a lateral side where the first region 110D or the second region 110E is not included, and may have a second thickness, being less than the first thickness, on another lateral side where the first region 110D or the second region 110E is included.

The mobile electronic device 100 may include at least one of a display 101, audio modules 103, 107 and 114, sensor modules 104 and 119, camera modules 105, 112 and 113, a key input device 117, a light emitting device, and connector holes 108 and 109. The mobile electronic device 100 may omit at least one (e.g., the key input device 117 or the light emitting device) of the above components, or may further include other components.

The display 101 may be visible through a substantial portion of the front plate 102, for example. At least a part of the display 101 may be visible through the front plate 102 that forms the first surface 110A and the first region 110D of the lateral surface 110C. Outlines (i.e., edges and corners) of the display 101 may have substantially the same form as those of the front plate 102. The spacing between the outline of the display 101 and the outline of the front plate 102 may be substantially unchanged in order to enlarge the visible area of the display 101.

A recess or opening may be formed in a portion of a display area of the display 101 to accommodate at least one of the audio module 114, the sensor module 104, the camera module 105, and the light emitting device. At least one of the audio module 114, the sensor module 104, the camera module 105, a fingerprint sensor (not shown), and the light emitting element may be disposed on the back of the display area of the display 101. The display 101 may be combined with, or adjacent to, a touch sensing circuit, a pressure sensor capable of measuring the touch strength (pressure), and/or a digitizer for detecting a stylus pen. At least a part of the sensor modules 104 and 119 and/or at least a part of the key input device 117 may be disposed in the first region 110D and/or the second region 110E.

The audio modules 103, 107 and 114 may correspond to a microphone hole 103 and speaker holes 107 and 114, respectively. The microphone hole 103 may contain a microphone disposed therein for acquiring external sounds and, in a case, contain a plurality of microphones to sense a sound direction. The speaker holes 107 and 114 may be classified into an external speaker hole 107 and a call receiver hole 114. The microphone hole 103 and the speaker holes 107 and 114 may be implemented as a single hole, or a speaker (e.g., a piezo speaker) may be provided without the speaker holes 107 and 114.

The sensor modules 104 and 119 may generate electrical signals or data corresponding to an internal operating state of the mobile electronic device 100 or to an external environmental condition. The sensor modules 104 and 119 may include a first sensor module 104 (e.g., a proximity sensor) and/or a second sensor module (e.g., a fingerprint sensor) disposed on the first surface 110A of the housing 110, and/or a third sensor module 119 (e.g., a heart rate monitor (HRM) sensor) and/or a fourth sensor module (e.g., a fingerprint sensor) disposed on the second surface 110B of the housing 110. The fingerprint sensor may be disposed on the second surface 110B as well as the first surface 110A (e.g., the display 101) of the housing 110. The electronic device 100 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112 and 113 may include a first camera device 105 disposed on the first surface 110A of the electronic device 100, and a second camera device 112 and/or a flash 113 disposed on the second surface 110B. The camera module 105 or the camera module 112 may include one or more lenses, an image sensor, and/or an image signal processor. The flash 113 may include, for example, a light emitting diode or a xenon lamp. Two or more lenses (infrared cameras, wide angle and telephoto lenses) and image sensors may be disposed on one side of the electronic device 100.

The key input device 117 may be disposed on the lateral surface 110C of the housing 110. The mobile electronic device 100 may not include some or all of the key input device 117 described above, and the key input device 117 which is not included may be implemented in another form such as a soft key on the display 101. The key input device 117 may include the sensor module disposed on the second surface 110B of the housing 110.

The light emitting device may be disposed on the first surface 110A of the housing 110. For example, the light emitting device may provide status information of the electronic device 100 in an optical form. The light emitting device may provide a light source associated with the operation of the camera module 105. The light emitting device may include, for example, a light emitting diode (LED), an IR LED, or a xenon lamp.

The connector holes 108 and 109 may include a first connector hole 108 adapted for a connector (e.g., a universal serial bus (USB) connector) for transmitting and receiving power and/or data to and from an external electronic device, and/or a second connector hole 109 adapted for a connector (e.g., an earphone jack) for transmitting and receiving an audio signal to and from an external electronic device.

Some sensor modules 105 of camera modules 105 and 212, some sensor modules 104 of sensor modules 104 and 119, or an indicator may be arranged to be exposed or extend through a display 101. For example, the camera module 105, the sensor module 104, or the indicator may be arranged in the internal space of an electronic device 100 so as to be brought into contact with an external environment through an opening of the display 101, which is perforated up to a front plate 102. In an embodiment, some sensor modules 104 may be arranged to perform their functions without being visually exposed through the front plate 102 in the internal space of the electronic device. For example, in this case, an area of the display 101 facing the sensor module may not require a perforated opening.

Figure 3:
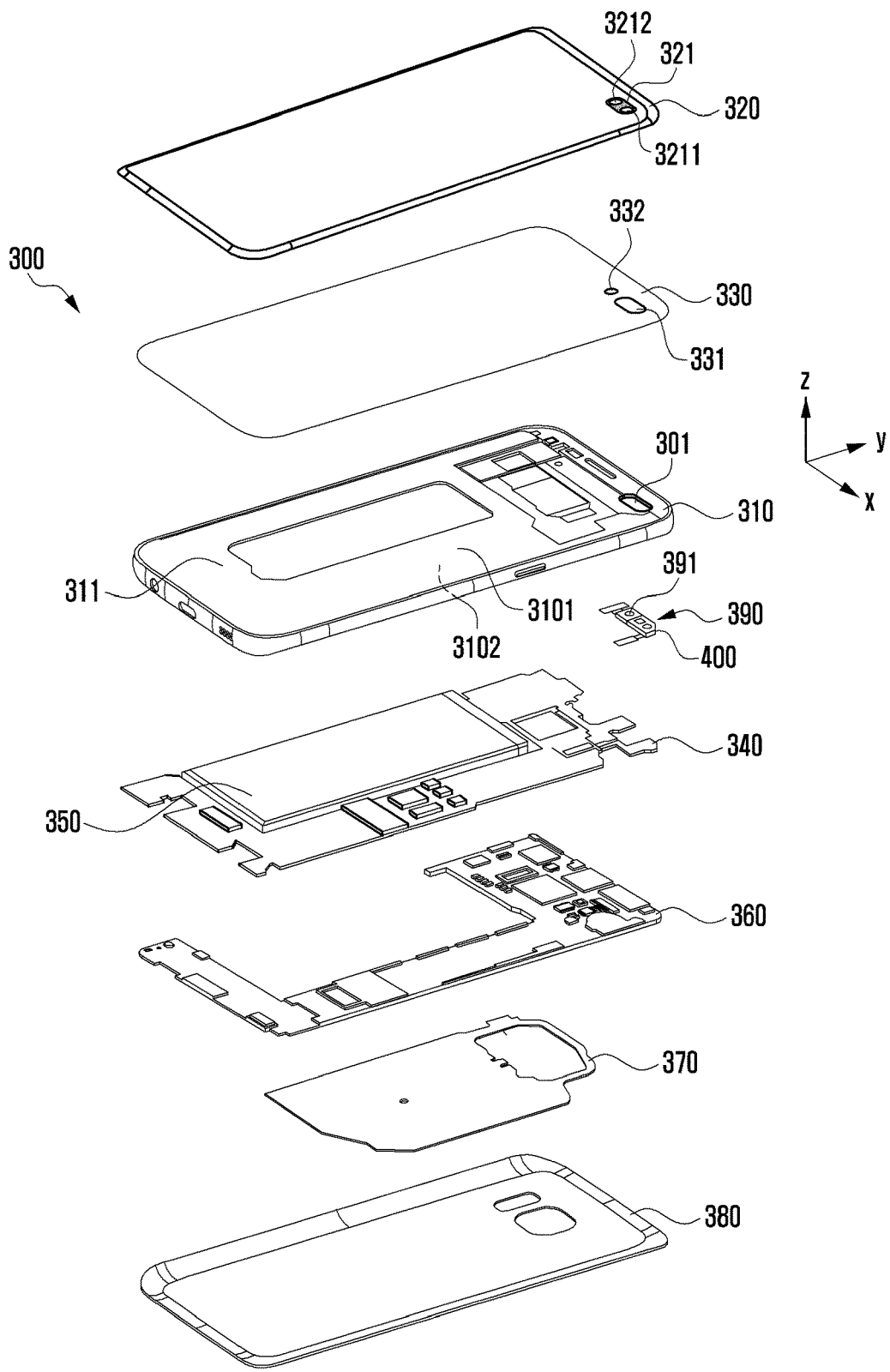
FIG. 3 is an exploded perspective view of the electronic device in FIG. 1 according to various embodiments.

FIG. 3 is an exploded perspective view showing a mobile electronic device shown in FIG. 1 according to various embodiments.

The electronic device 300 of FIG. 3 may be at least partially similar to the electronic device 100 of FIGS. 1 and 2, or may include other embodiments of an electronic device.

Referring to FIG. 3, a mobile electronic device 300 may include a lateral bezel structure 310, a first support member 311 (e.g., a bracket), a front plate 320, a display 330, an electromagnetic induction panel (not shown), a printed circuit board (PCB) 340, a battery 350, a second support member 360 (e.g., a rear case), an antenna 370, and a rear plate 380. The mobile electronic device 300 may omit at least one (e.g., the first support member 311 or the second support member 360) of the above components or may further include another component. Some components of the electronic device 300 may be the same as or similar to those of the mobile electronic device 100 shown in FIG. 1 or FIG. 2, thus, descriptions thereof are omitted below.

The first support member 311 is disposed inside the mobile electronic device 300 and may be connected to, or integrated with, the lateral bezel structure 310. The first support member 311 may be formed of, for example, a metallic material and/or a non-metal (e.g., polymer) material. The first support member 311 may be combined with the display 330 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 310 and/or the first support member 311.

According to various embodiments, the electronic device 300 may include a distance detection sensor module (e.g., including various distance detection circuitry) 400 (e.g., TOF sensor module) disposed in the internal space. According to an embodiment, the distance detection sensor module 400 may be disposed together with at least one camera module 391 as a single camera assembly 390. In an embodiment, the distance detection sensor module 400 may be independently disposed in the internal space of the electronic device 300.

According to various embodiments, the distance detection sensor module 400 may be disposed between the first support member 311 of the side member 310 and the rear plate 380 so as to be exposed or protruded toward the front plate 320 through the first opening 301 formed on the first support member 311. According to an embodiment, the distance detection sensor module 400 and the camera module 391 exposed through the first opening 301 may be disposed in a state of being exposed or at least partially inserted toward the front plate 320 through the second opening 331 and the third opening 332 formed on the display 330. In an embodiment, the second opening 331 and the third opening 332 may be integrally formed. According to an embodiment, the distance detection sensor module 400 and the camera module 391 arranged to be exposed through the second opening 331 and the third opening 332 of the display 330 may be disposed to face a first exposure region 3211 and a second exposure region 3212 formed in the print region 321 of the front plate 320. In an embodiment, the first exposure region 3211 and the second exposure region 3212 may be disposed without the print region 321. In an embodiment, the first exposure region 3211 and the second exposure region 3212 may be integrally formed.

Figure 4:
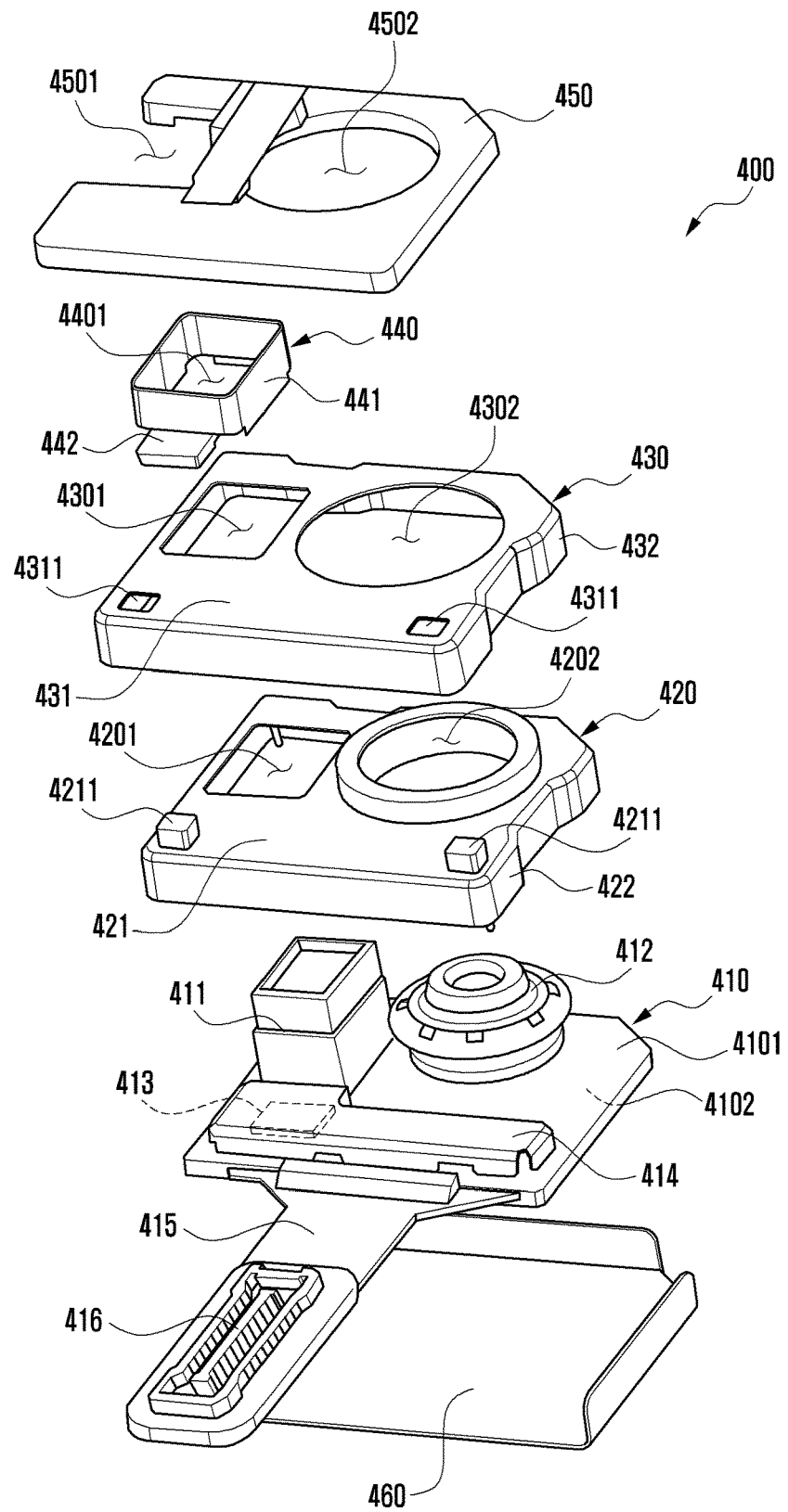
FIG. 4 is an exploded perspective view of a distance detection sensor module according to various embodiments.
Figure 5:
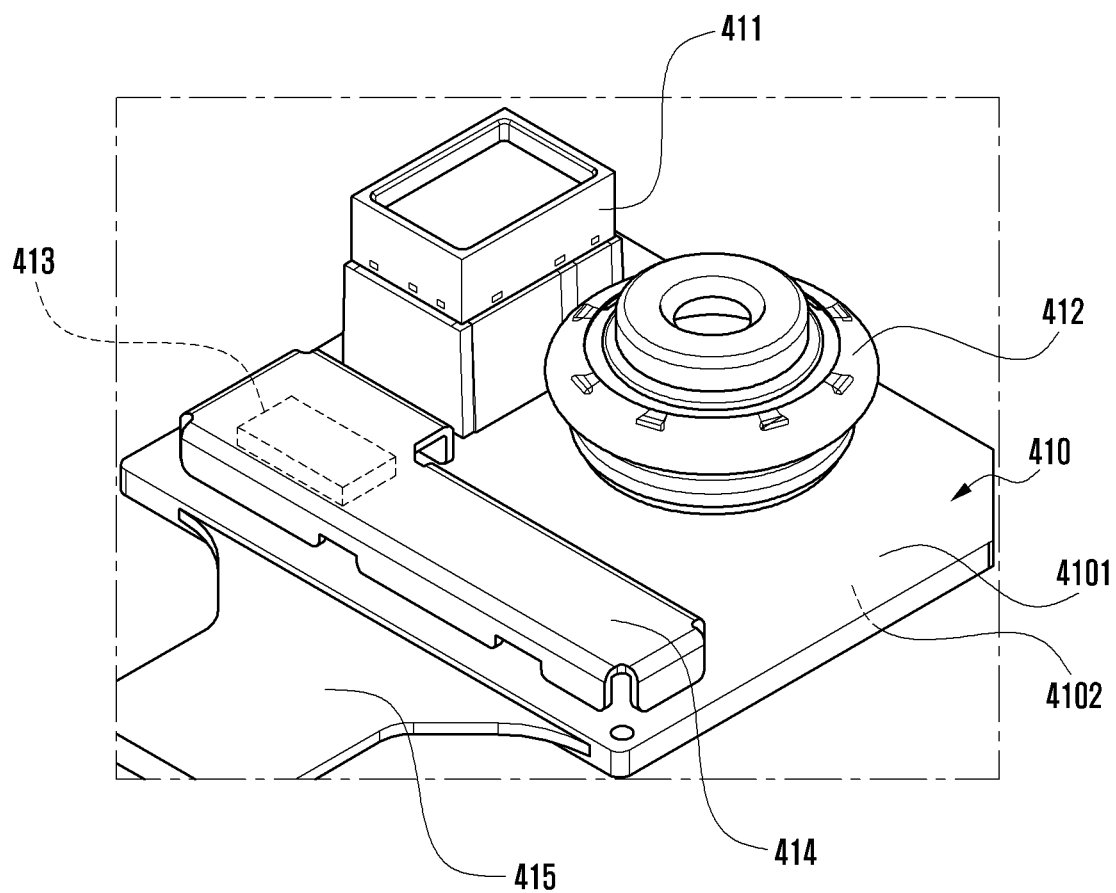
FIG. 5 is a perspective view of a substrate according to various embodiments.
Figure 6A:
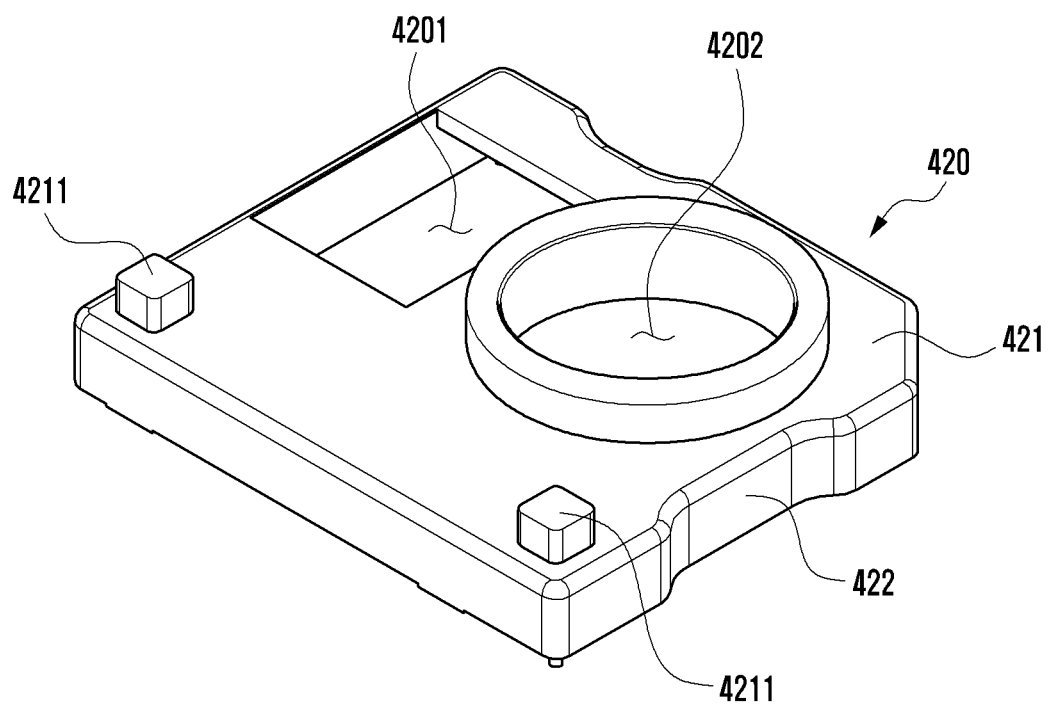
FIG. 6A is a perspective view of a module housing according to various embodiments.
Figure 6B:
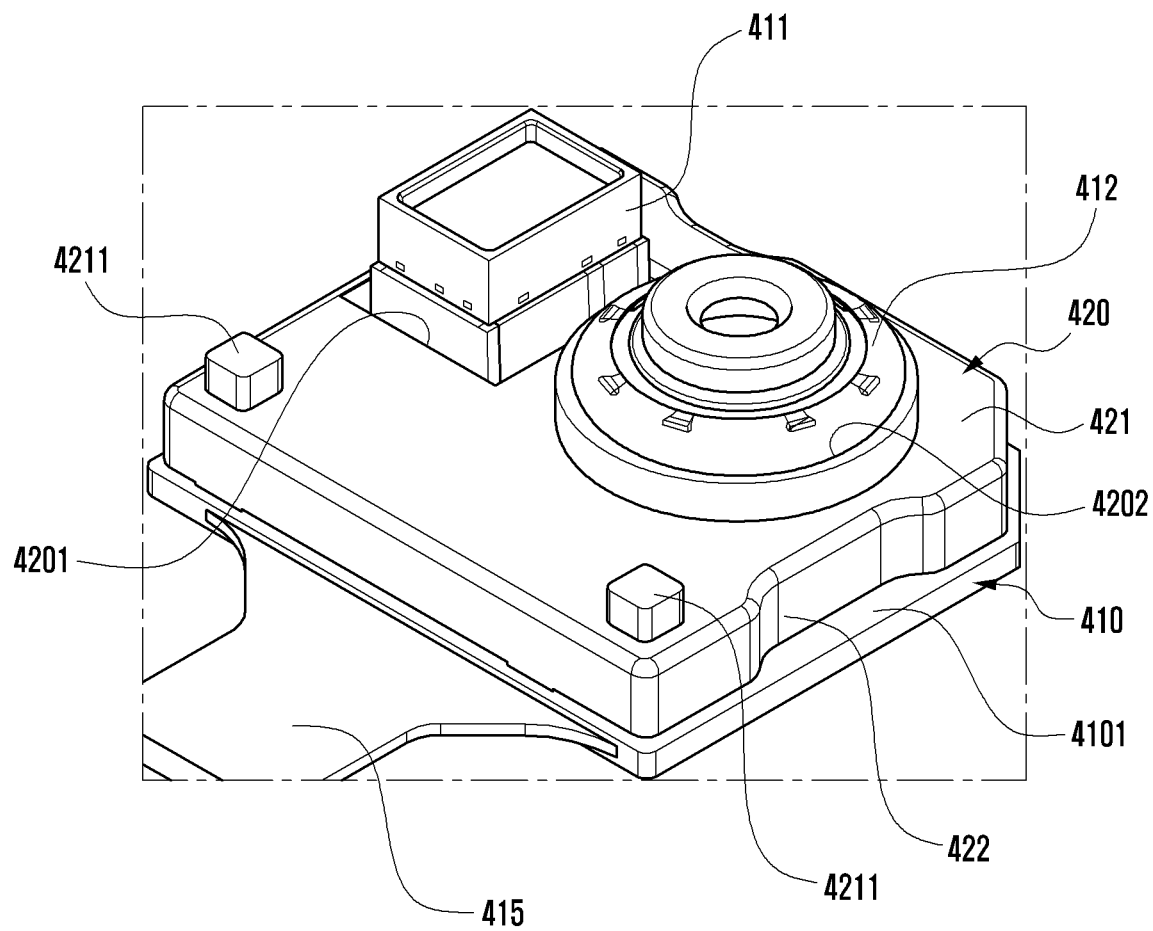
FIG. 6B is a perspective view illustrating a state in which the module housing is disposed on the substrate according to various embodiments.
Figure 7:
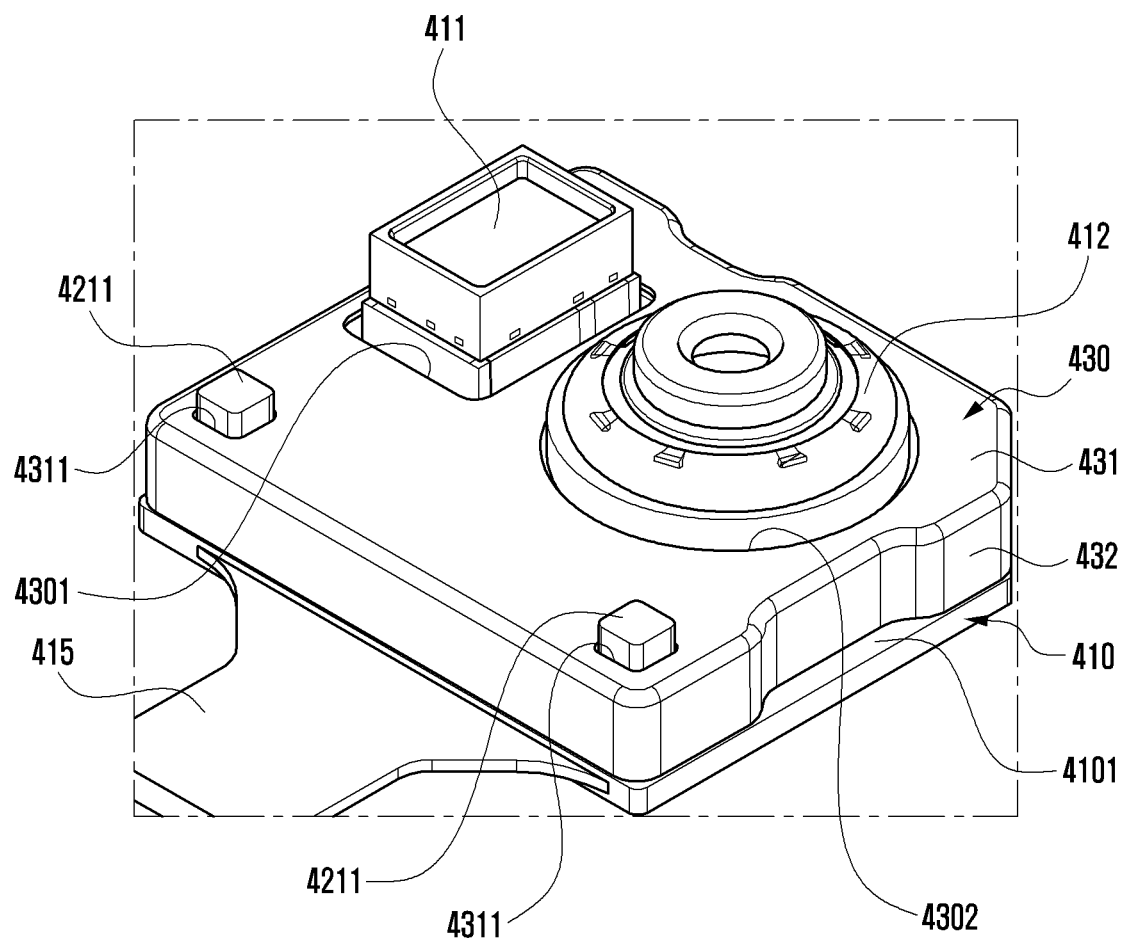
FIG. 7 is a perspective view illustrating a state in which a first shield can is disposed on the module housing according to various embodiments.
Figure 8:
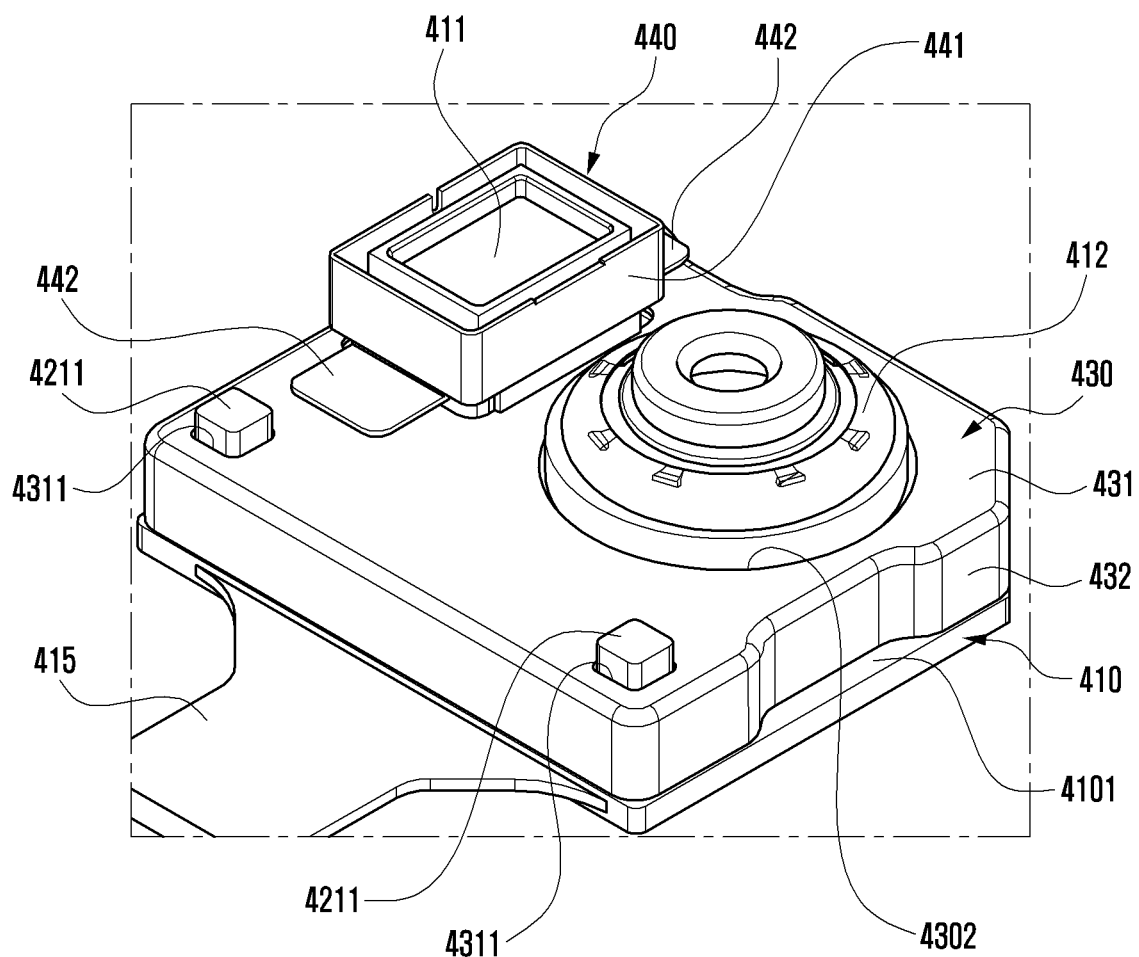
FIG. 8 is a perspective view illustrating a state in which a second shield can is disposed on the first shield can according to various embodiments.
Figure 9:
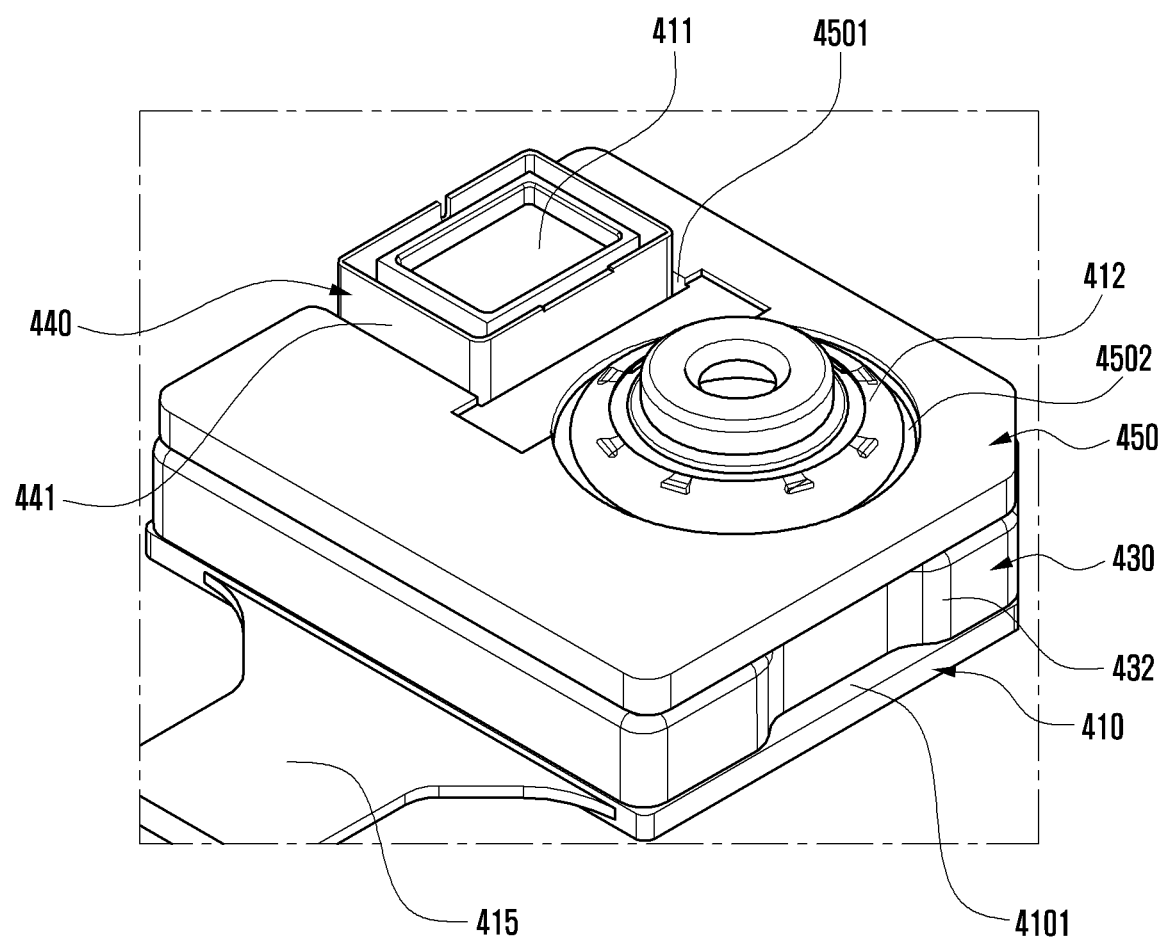
FIG. 9 is a perspective view illustrating a state in which a shielding plate is disposed on the first shield can according to various embodiments.
Figure 10A:
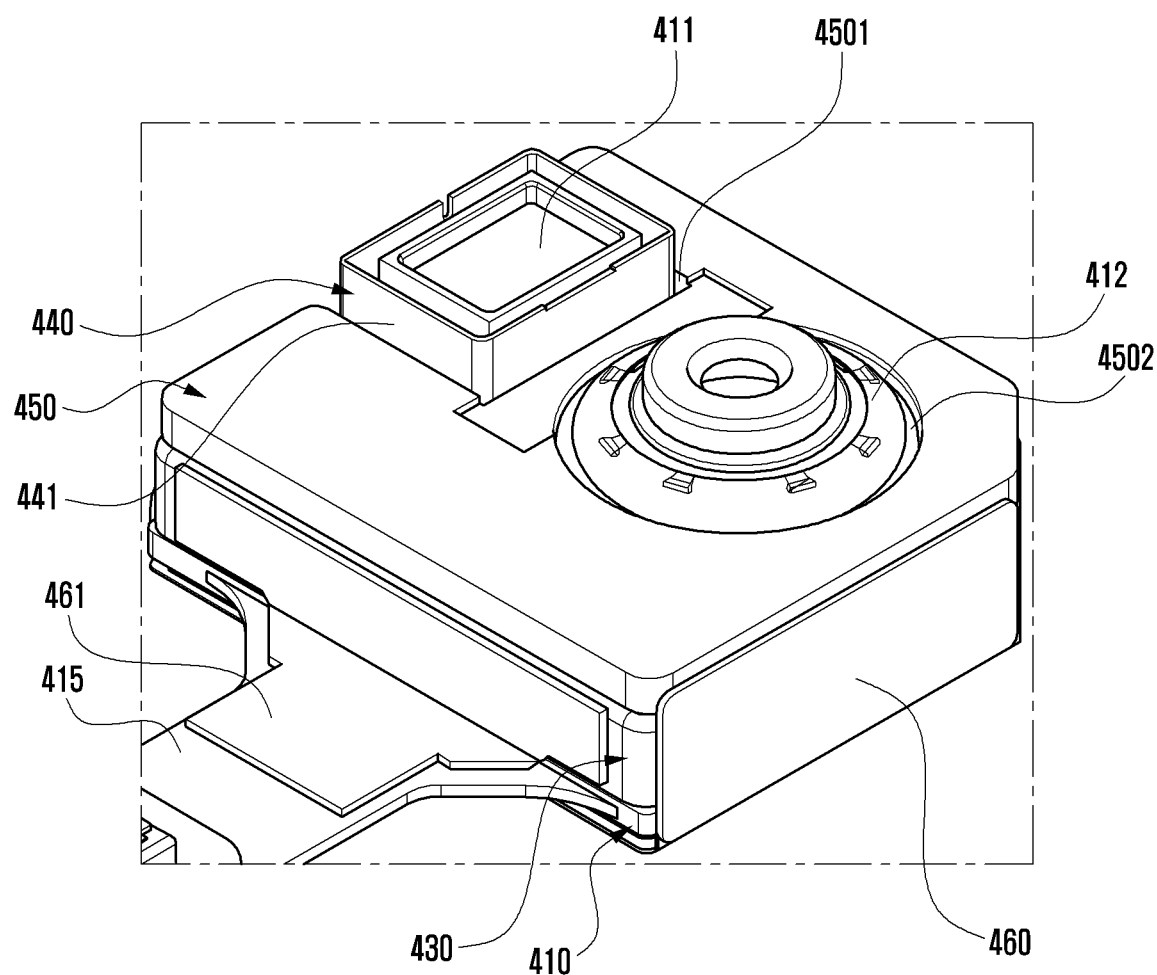
FIGS. 10A, 10B, 10C and 10D are diagrams illustrating a state in which a shielding sheet is applied to the distance detection sensor module according to various embodiments.
Figure 10B:
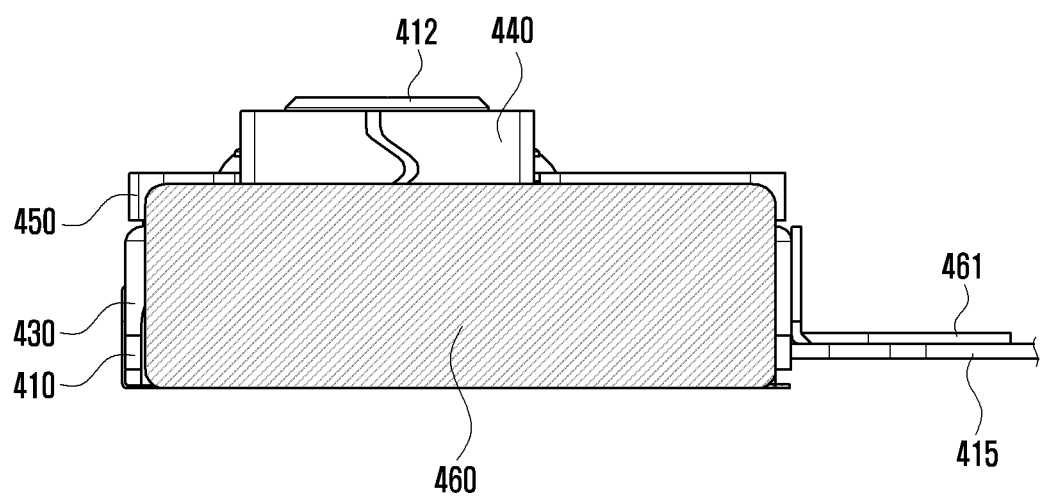
Figure 10C:
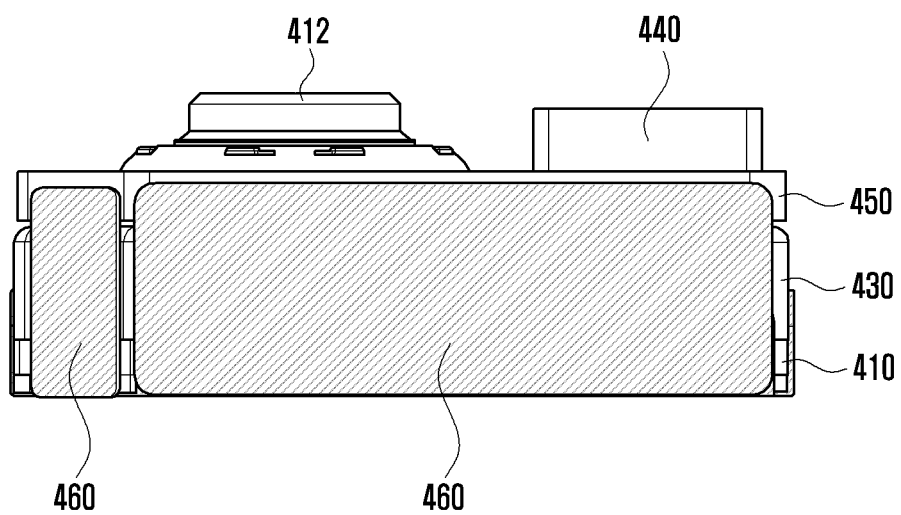
Figure 10D:
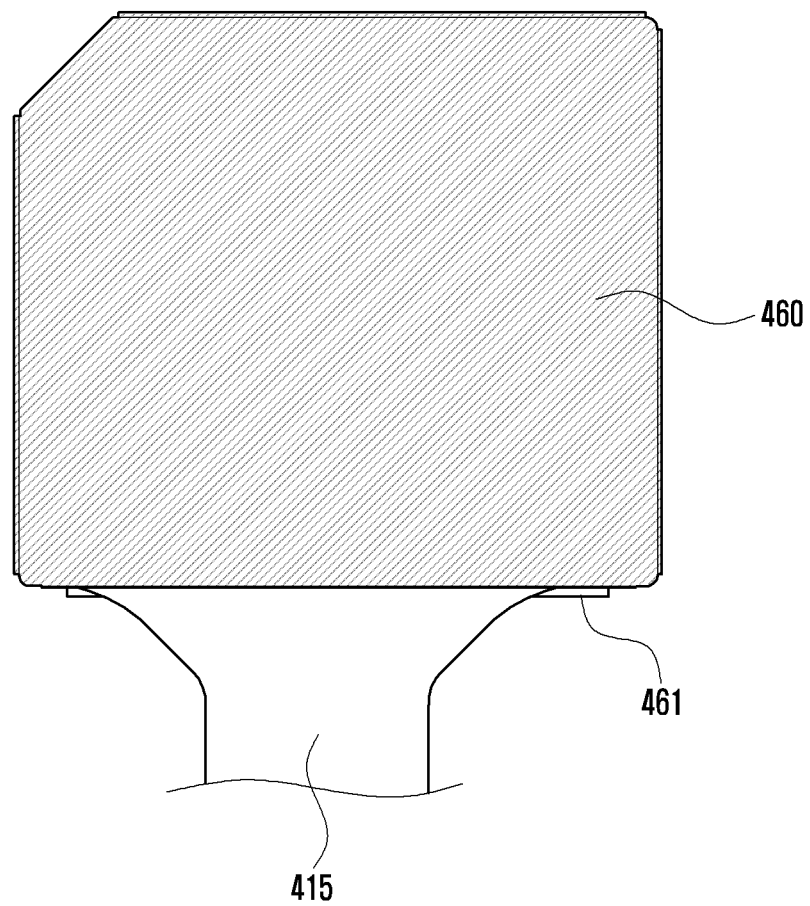

FIG. 4 is an exploded perspective view of the distance detection sensor module 400 according to various embodiments. FIGS. 5, 6A, 6B, 7, 8, 9, 10A, 10B, 10C and 10D are views illustrating states where the distance detection sensor module 400 is assembled in sequence. For example, FIG. 5 is a perspective view of a substrate 410 according to various embodiments. FIG. 6A is a perspective view of a module housing 420 according to various embodiments. FIG. 6B is a perspective view illustrating a state in which the module housing 420 is disposed on the substrate 410 according to various embodiments. FIG. 7 is a perspective view illustrating a state in which a first shield can 430 is disposed on the module housing 420 according to various embodiments. FIG. 8 is a perspective view illustrating a state in which a second shield can 440 is disposed on the first shield can 430 according to various embodiments. FIG. 9 is a perspective view illustrating a state in which a shielding plate 450 is disposed on the first shield can 430 according to various embodiments. FIGS. 10A, 10B, 10C and 10D are views illustrating a state in which a shielding sheet 460 or 470 is applied to the distance detection sensor module 400 according to various embodiments.

With reference to FIG. 4, the distance detection sensor module 400 (e.g., time-of-flight (TOF) sensor module) may include a substrate 410, a module housing 420, a first shield can 430, a second shield can 440, and a shielding plate 450, where the components 420 to 450 may be sequentially disposed on the substrate 410. According to an embodiment, the distance detection sensor module 400 may include at least one shielding sheet 460 and 470 (refer to FIGS. 11A, 11B, 11C) attached to cover at least some of the substrate 410 (e.g., substrate structure), the module housing 420, the first shield can 430, and the shielding plate 450. According to an embodiment, the shielding sheets 460 and 470 may include a conductive EMI shielding tape.

With reference to FIGS. 4 and 5, the substrate 410 may include a first substrate surface 4101, and a second substrate surface 4102 facing the direction opposite to the first substrate surface 4101. According to an embodiment, the substrate 410 may include a light emitting unit (e.g., including light emitting circuitry) 411 (e.g., light emitting structure) disposed on the first substrate surface 4101, a light receiving unit (e.g., including light receiving circuitry) 412 (e.g., light receiving structure) to receive light that is irradiated from the light emitting unit 411 and reflected by an external object, and a control circuit 413. According to an embodiment, the light emitting unit 411 may include various light emitting circuitry including, for example, a vertical cavity surface emitting laser (VCSEL). According to an embodiment, the light receiving unit 412 may include various light receiving circuitry including, for example, an infrared sensor (e.g., infrared camera) including a plurality of lenses and a depth sensor. According to an embodiment, the control circuit 413 may include a driver IC and other electrical elements. According to various embodiments, the substrate 410 may include a third shield can 414 that is mounted on the first substrate surface 411 of the substrate 410 to substantially surround the control circuit 413. According to an embodiment, the third shield can 414 may be electrically connected to a ground layer included in the substrate 410. According to an embodiment, the third shield can 414 may be electrically connected to the ground layer of the substrate 410 directly through a conductive bonding process such as soldering. In an embodiment, the third shield can 414 may be electrically connected to the ground layer of the substrate 410 through a conductive fixing member. According to an embodiment, the substrate 410 may include a flexible printed circuit board (FPCB) 415 that is drawn out from the substrate 410 to a specific length and includes a connector 416 at an end thereof. According to an embodiment, the distance detection sensor module 400 may be electrically connected to the main board (e.g., printed circuit board 340 in FIG. 3) disposed inside the electronic device (e.g., electronic device 300 in FIG. 3) through the FPCB 415 and the connector 416. According to an embodiment, the third shield can 414 may be grounded to the main board (e.g., printed circuit board 340 in FIG. 3) of the electronic device (e.g., electronic device 300 in FIG. 3) through the ground layer of the substrate 410 and the FPCB 415.

With reference to FIGS. 4, 6A and 6B, the distance detection sensor module 400 may include a module housing 420 disposed on the substrate 410. According to an embodiment, the module housing 420 may include a first upper surface 421, and a first side surface 422 extended to a specific depth along the rim of the first upper surface 421. According to an embodiment, the module housing 420 may include a first through hole or opening 4201 formed through the first upper surface 421 and a second through hole or opening 4202 disposed adjacent to the first through hole 4201. According to an embodiment, the module housing 420 may include at least one alignment protrusion 4211 formed to protrude from the first upper surface 421. According to an embodiment, the module housing 420 may be formed of a polymer (e.g., PC) through an injection process.

According to various embodiments, the module housing 420 may be mounted on the first substrate surface 4101 of the substrate 410. According to an embodiment, the module housing 420 may be fixed to the first substrate surface 4101 through bonding, taping, or welding. According to an embodiment, when the module housing 420 is mounted on the substrate 410, the third shield can 414, which shields the light emitting unit 411, the light receiving unit 412, and the control circuit 413 mounted on the first substrate surface 4101 of the substrate 410, may be at least partially accommodated in an internal space formed through the first side surface 422 of the module housing 420. In this case, the light emitting unit 411 may at least partially protrude through the first through hole 4201 of the module housing 420. According to an embodiment, the light receiving unit 412 may also at least partially protrude through the second through hole 4202 of the module housing 420.

With reference to FIGS. 4 and 7, the distance detection sensor module 400 may include a first shield can 430 disposed to cover the module housing 420. According to an embodiment, the first shield can 430 may include a second upper surface 431, and a second side surface 432 extended to a specific depth along the rim of the second upper surface 431. According to an embodiment, the first shield can 430 may include a third through hole or opening 4301 formed on the second upper surface 431 and a fourth through hole or opening 4302 disposed adjacent to the third through hole 4301. According to an embodiment, the third through hole 4301 may be formed at a position cone sponding to the first through hole 4201. According to an embodiment, the fourth through hole 4302 may be formed at a position corresponding to the second through hole 4202. According to an embodiment, the first shield can 430 may include at least one alignment through hole 4311 disposed at a position corresponding to the alignment protrusion 4211 of the module housing 420.

According to various embodiments, the first shield can 430 may be disposed on the module housing 420 so that the second upper surface 431 faces the first upper surface 421 of the module housing 420 and the second side surface 432 faces the first side surface 422. According to an embodiment, the first shield can 430 may be made of a conductive material. According to an embodiment, the first shield can 430 may be made of Cu, Al, or SUS. According to an embodiment, when the first shield can 430 is disposed on the module housing 420, it may be electrically connected to the ground layer included in the substrate 410. According to an embodiment, the first shield can 430 may be electrically connected to the ground layer of the substrate 410 directly through a conductive bonding structure such as soldering. In an embodiment, the first shield can 430 may be electrically connected to the ground layer of the substrate 410 through a conductive fixing member. Hence, the first shield can 430 may be grounded to the main board (e.g., printed circuit board 340 in FIG. 3) of the electronic device (e.g., electronic device 300 in FIG. 3) through the ground layer of the substrate 410 and the FPCB 415.

According to various embodiments, when the first shield can 430 is disposed on the module housing 420, the light emitting unit 411 protruding from the module housing 420 may protrude through the third through hole 4301 of the first shield can 430. According to an embodiment, the light receiving unit 412 may also protrude through the fourth through hole 4302 of the first shield can 430.

According to various embodiments, the first shield can 430 may be disposed with correct alignment on the module housing 420 through an alignment structure. For example, when the first shield can 430 is mounted on the module housing 420, at least one alignment protrusion 4211 is inserted into the at least one alignment through hole 4311, so that the first shield can 430 may be correctly mounted on the module housing 420. According to an embodiment, to facilitate mounting of the shielding plate 450 to be described later, the alignment protrusion 4211 may be formed to have a size that allows the alignment protrusion 4211 to be inserted into the alignment through hole 4311 but at least not to protrude to the second upper surface 431 of the first shield can 430. In an embodiment, when the alignment protrusion 4211 protrudes to the second upper surface 431 through the alignment through hole 4311, the shielding plate 450 to be described later may be formed in a shape having a portion capable of accommodating the protruding portion of the alignment protrusion 4211.

With reference to FIGS. 4 and 8, the distance detection sensor module 400 may include a second shield can 440 disposed on the second upper surface 431 of the first shield can 430. According to an embodiment, the second shield can 440 may be disposed in a manner that surrounds the side of the light emitting unit 411, which mainly generates noise and protrudes through the third through hole 4301 of the second upper surface 431 of the first shield can 430. According to an embodiment, the second shield can 440 may include a shielding wall 441 formed to surround the light emitting unit 411 protruding through the third through hole 4301, and at least one flange 442 extended through at least some of the shielding wall 441 and contacting the second upper surface 431 of the first shield can 430. According to an embodiment, the second shield can 440 may include a receiving hole 4401 that is formed to be opened in an upward direction (e.g., toward the front plate) for a light irradiation region of the light emitting unit 411 through the shielding wall 441. According to an embodiment, the shielding wall 441 may be formed in a closed loop shape or in an open loop shape with an opened portion along the side of the protruding light emitting unit 411. According to an embodiment, to improve the shielding power, the second shield can 440 may be formed such that the height of the shielding wall 411 is higher than or equal to the protruding height of the light emitting unit 411 protruding through the third through hole 4301. According to an embodiment, the second shield can 440 may also be made of a conductive material. According to an embodiment, the second shield can 440 may be made of Cu, Al, or SUS. According to an embodiment, the second shield can 440 may be fixed on the second upper surface 4301 of the first shield can 430 through conductive bonding, conductive taping, or welding. Hence, the second shield can 440 may be grounded to the main board (e.g., printed circuit board 340 in FIG. 3) of the electronic device (e.g., electronic device 300 in FIG. 3) through the first shield can 430, the ground layer of the substrate 410, and the FPCB 415.

With reference to FIGS. 4 and 9, the distance detection sensor module 400 may include a shielding plate 450 disposed on the second upper surface 431 of the first shield can 430. According to an embodiment, the shielding plate 450 may be made of an injection molding material whose outer surface is coated with a conductive substance. According to an embodiment, the conductive substance may include Ni, Al, Ag or Cu. In an embodiment, the shielding plate 450 may be made of a conductive member (e.g., metal member).

According to various embodiments, the shielding plate 450 may include a fifth through hole 4501 and a sixth through hole 4502 disposed adjacent to the fifth through hole 4501. According to an embodiment, the fifth through hole 4501 may be formed at a position corresponding to the third through hole 4301. According to an embodiment, the sixth through hole 4502 may be formed at a position corresponding to the fourth through hole 4302. According to an embodiment, the shielding plate 450 may be formed to have a size substantially corresponding to that of the second upper surface 4301 of the first shield can 430. According to an embodiment, the shielding plate 450 may be fixed on the second upper surface 431 of the first shield can 430 through conductive bonding, conductive taping, or welding. According to an embodiment, when the shielding plate 450 is disposed on the second upper surface 431, at least some of the shielding wall 441 of the second shielding can 440 that shields the light emitting unit 411 may be disposed so as to at least partially be exposed or protrude through the fifth through hole 4501 of the shielding plate 450. According to an embodiment, the light receiving unit 412 may also be disposed so as to at least partially be exposed or protrude through the sixth through hole 4502. Hence, the shielding plate 450 may be grounded to the main board (e.g., printed circuit board 340 in FIG. 3) of the electronic device (e.g., electronic device 300 in FIG. 3) through the first shield can 430, the ground layer of the substrate 410, and the FPCB 415.

With reference to FIG. 4 and FIGS. 10A, 10B, 10C and 10D, the distance detection sensor module 400 may include a shielding sheet 460 attached through the outer surface of the assembly assembling up to the shielding plate 450. According to an embodiment, the shielding sheet 460 may be a conductive tape member (e.g., EMI shielding member), and may be formed in a shape that is extended and bended from the second substrate surface 4102 to cover up to at least some of the module housing 420, the first shield can 430, and the shielding plate 450. In an embodiment, it may include a plurality of shielding sheets attached to the corresponding regions described above instead of a single shielding sheet 460. According to an embodiment, the distance detection sensor module 400 may include another shielding sheet 461 attached in such a way as to cover from at least some sides of the module housing 420 and/or the first shield can 430 to at least a portion of the FPCB 415. Hence, the shielding sheets 460 and 461 may also be grounded to the main board (e.g., printed circuit board 340 in FIG. 3) connected to the ground layer of the substrate 410 through the shield plate 450 and/or the first shield can 430.

According to various embodiments, the distance detection sensor module 400 can effectively shield noise through the first shield can 430, second shield can 440, third shield can 414, shielding plate 450, or shielding sheet 460 or 461, which is electrically connected to the ground (e.g., ground of the main board) of the electronic device (e.g., electronic device 300 of FIG. 3).

Figure 11A:
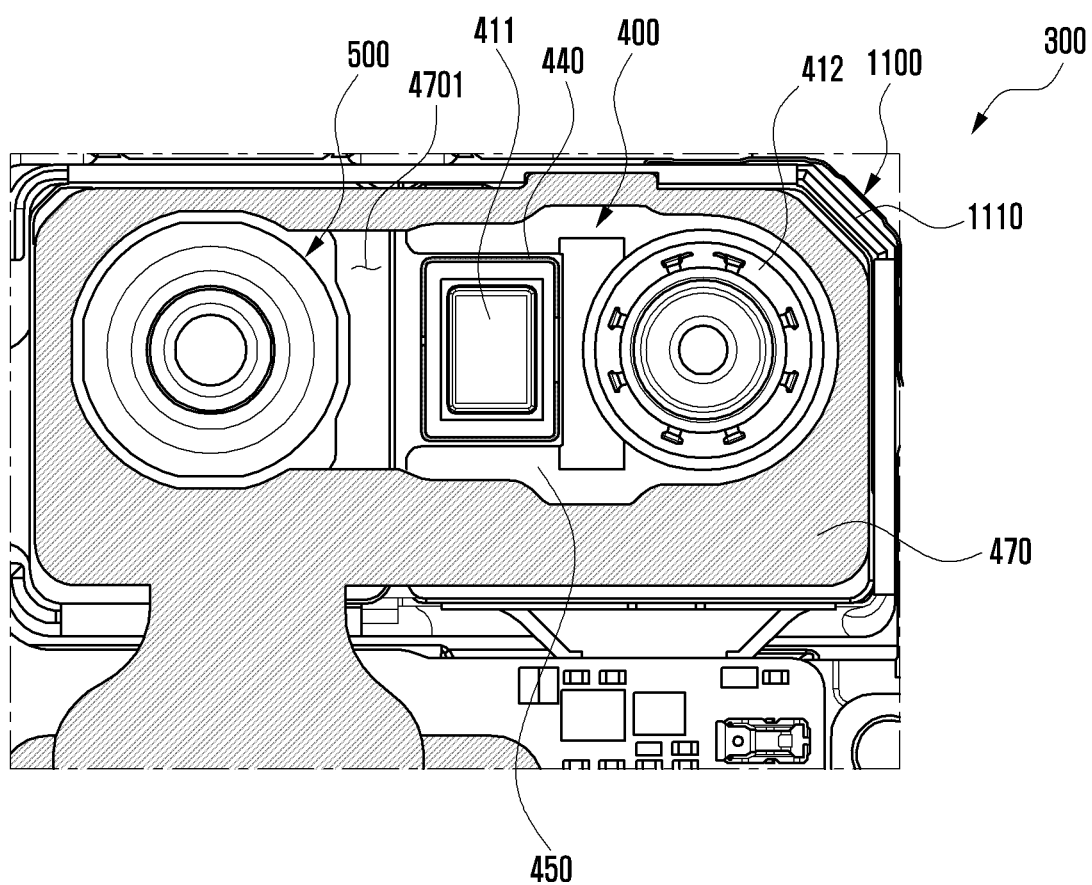
FIG. 11A is a diagram illustrating a state in which a conductive tape member is applied to a camera assembly including the distance detection sensor module according to various embodiments.
Figure 11B:
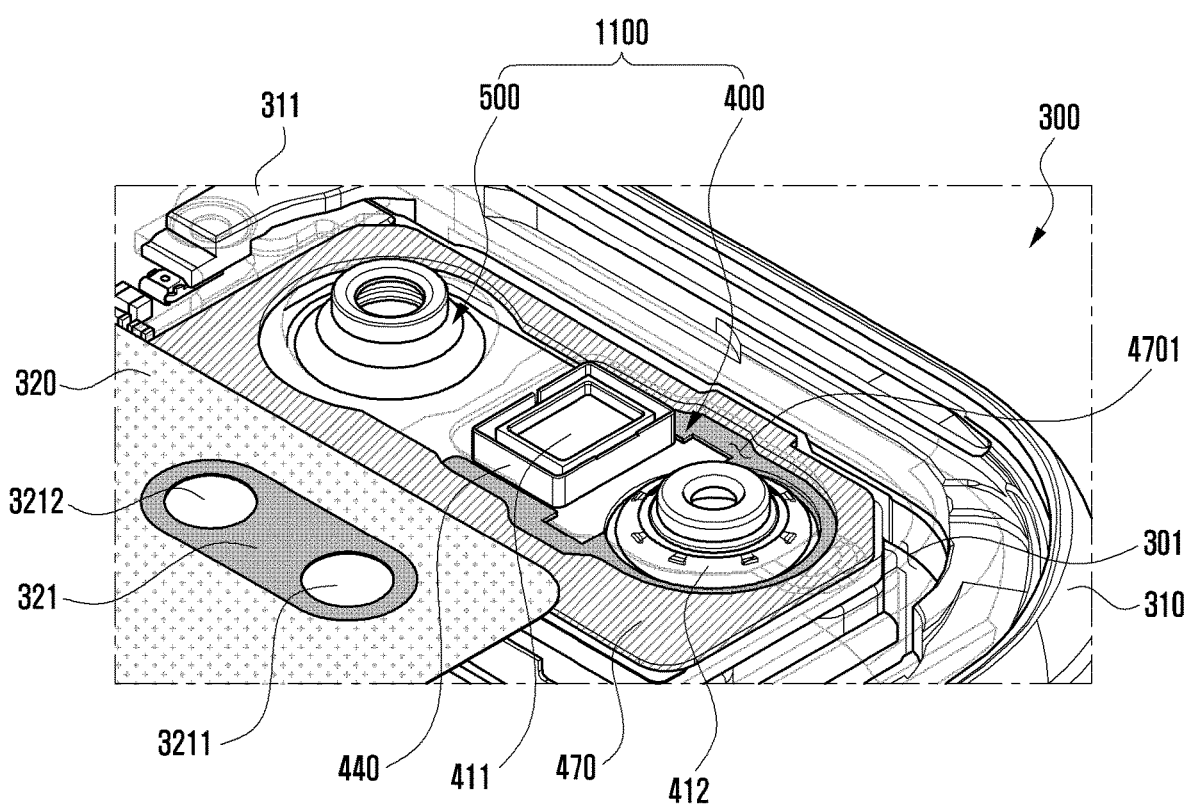
FIG. 11B is a partial perspective view illustrating a state in which the camera assembly in FIG. 11A is applied to an electronic device according to various embodiments.
Figure 11C:
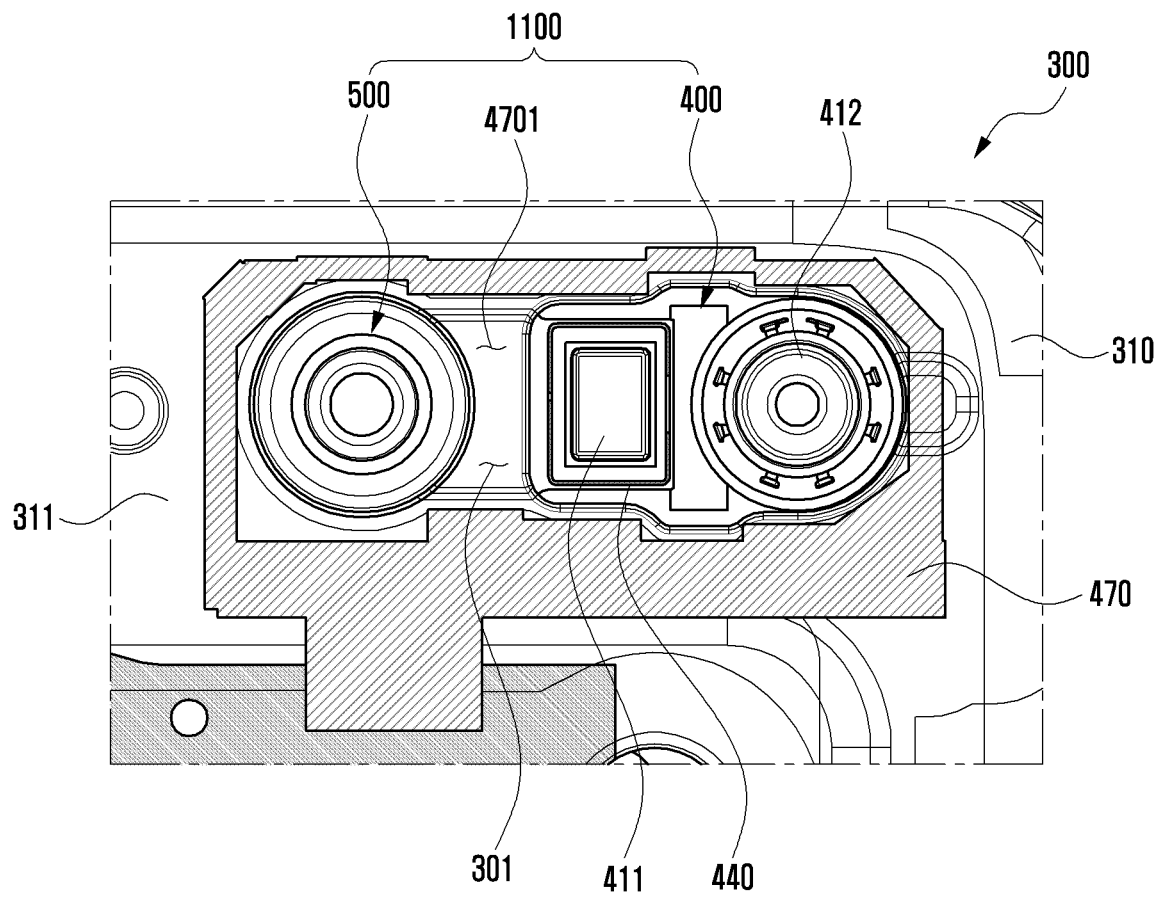
FIG. 11C is a diagram illustrating an attachment region of the conductive tape member according to various embodiments.

FIG. 11A is a diagram illustrating a state in which a shielding sheet including a conductive tape member 470 is applied to a camera assembly 1100 including the distance detection sensor module 400 according to various embodiments. FIG. 11B is a partial perspective view illustrating a state in which the camera assembly 1100 in FIG. 11A is applied to an electronic device 300 according to various embodiments. FIG. 11C is a diagram illustrating an attachment region of the conductive tape member 470 according to various embodiments.

With reference to FIGS. 11A, 11B and 11C, the electronic device 300 may include a camera assembly 1100 (e.g., camera assembly 390 in FIG. 3) including the distance detection sensor module 400 and camera module 500 described above. According to an embodiment, the camera assembly 1100 may include a single bracket 1110 for accommodating the distance detection sensor module 400 and the camera module 500 (e.g., camera module 391 in FIG. 3) together. According to an embodiment, the bracket 1110 may be made of an injection molding material, and may have a structure capable of accommodating at least some of the distance detection sensor module 400 and the camera module 500.

According to various embodiments, the camera assembly 1100 may be disposed to be supported in the internal space of the electronic device 300 through the conductive first support member 311 that at least partially extends from or is structurally coupled to the side member 310 of the electronic device 300 toward the internal space. For example, the camera assembly 1100 may be disposed between the first support member 311 and the rear plate (e.g., rear plate 380 in FIG. 3) and may be supported through the second surface (e.g., second surface 3102 in FIG. 3) of the first support member 311. In this case, the light emitting unit 411 and the light receiving unit 412 of the distance detection sensor module 400 of the camera assembly 1100 and at least a portion (e.g., body tube member) of the camera module 500 may be disposed so as to be exposed or protrude toward the front plate 320 through the first opening 301 formed on the first support member 311.

According to various embodiments, the electronic device 300 may include a conductive tape member 470 disposed between the camera assembly 1100 and the second surface (e.g., second surface 3102 in FIG. 3) of the first support member 311. According to an embodiment, the conductive tape member 470 may be formed to have a size to cover at least a portion of the distance detection sensor module 400 and the camera module 500. According to an embodiment, the conductive tape member 470 may include an opening 4701, and at least a portion of the light emitting unit 411 and light receiving unit 412 of the distance detection sensor module 400 and the camera module 500 may be exposed through the opening 4701. According to an embodiment, the conductive tape member 470 may be disposed in such a way as to be in contact with the shielding plate 450 disposed on the distance detection sensor module 400. According to an embodiment, the distance detection sensor module 400 may be provided with an extended ground for noise shielding by being in contact with the second surface (e.g., second surface 3102 in FIG. 3) of the first support member 311 through the conductive tape member 470. In an embodiment, the conductive tape member 470 may be applied in the same manner even when the distance detection sensor module 400 is disposed alone inside the electronic device 300.

According to various embodiments, when the front plate 320 is coupled with the side member 310, the first exposure region 3211 and the second exposure region 3212 formed in the print region 321 of the front plate 320 may face the distance detection sensor module 400 and the camera module 391 exposed through the first opening 301 of the first support member 311 and the opening 4701 of the conductive tape member 470.

Figure 12:
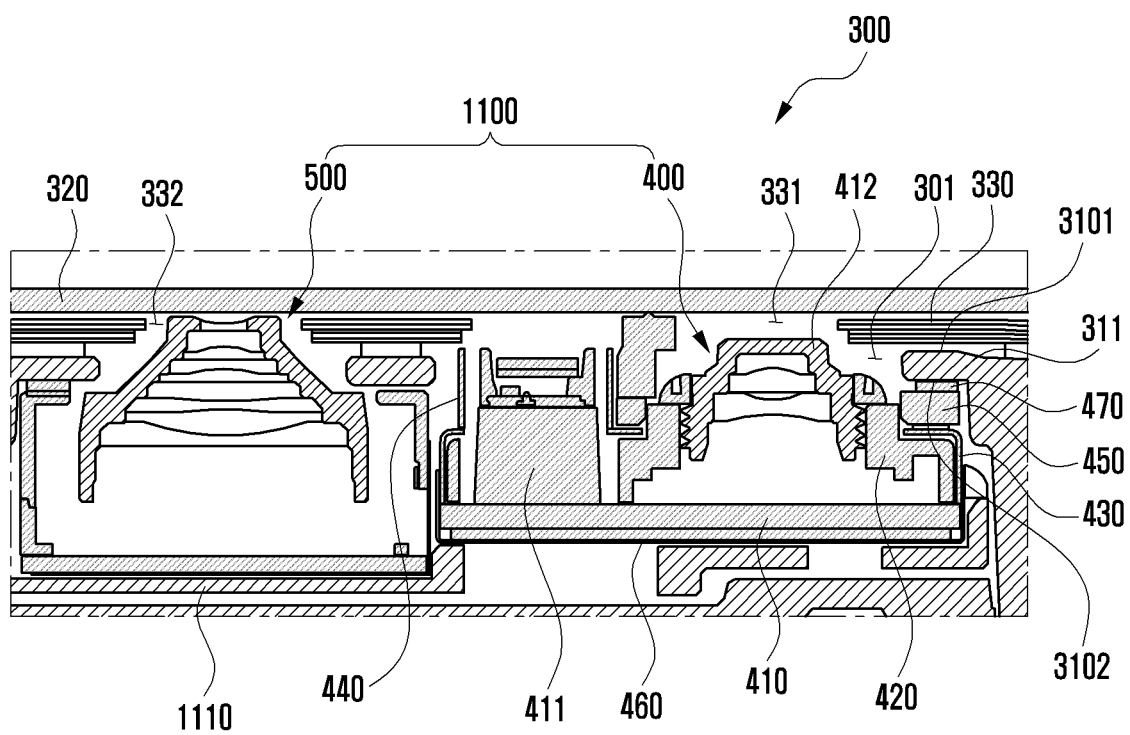
FIG. 12 is a partial cross-sectional view of the electronic device taken along line A-A' in FIG. 1 according to various embodiments.

FIG. 12 is a partial cross-sectional view of the electronic device 300 taken along line A-A' in FIG. 1 according to various embodiments.

The electronic device 300 of FIG. 12 may be at least partially similar to the electronic device 100 of FIGS. 1 and 2, or may include various embodiments of an electronic device.

With reference to FIG. 12, the electronic device 300 may include a front plate 320 (e.g., front cover), a rear plate (e.g., rear plate 380 in FIG. 3) (e.g., rear cover) facing the direction opposite to the front plate 320, and a side member 310 disposed to surround the space between the front plate 320 and the rear plate 380. According to an embodiment, the side member 310 may include a first support member 311 extended toward the space and at least partially including a conductive portion. According to an embodiment, the first support member 311 may include a first surface 3101 facing the front plate 320, and a second surface 3102 facing the direction in opposite to the first surface 3101. According to an embodiment, the first support member 311 may include a first opening 301 penetrating from the first surface 3101 to the second surface 3102. According to various embodiments, the electronic device 300 may include a camera assembly 1100 (e.g., camera assembly 390 in FIG. 3) that is disposed in the internal space of the electronic device 300 to be supported by the first support member 311. According to an embodiment, as described above, the camera assembly 1100 may include a distance detection sensor module 400 and a camera module 500 (e.g., camera module 391 in FIG. 3) arranged side by side on a single bracket 1110. According to an embodiment, the camera assembly 1100 may be disposed to be supported by the first surface 3101 of the first support member 311 in the internal space of the electronic device 300, and the light emitting unit 411 and light receiving unit 412 of the distance detection sensor module 400 and at least a portion (e.g., body tube member) of the camera module 500 may be disposed so as to protrude or be exposed toward the front plate 320 through the first opening 301 of the first support member 311. In this case, a conductive tape member 470 may be interposed between the camera assembly 1100 and the second surface 3102 of the first support member 311.

According to various embodiments, the electronic device 300 may include a display 330 disposed in the internal space so as to be visible from the outside through at least a portion of the front plate 320. According to an embodiment, when the front plate 320 includes at least a partially curved portion, the display 330 may include a flexible display configured to correspond thereto. According to an embodiment, the display 330 may be disposed between the front plate 320 and the first surface 3101 of the first support member 311. According to an embodiment, the display 330 may be attached to the rear surface of the front plate 320 through an adhesive member. According to an embodiment, the display 330 may include a second opening 331 and a third opening 332 formed at positions corresponding to the light emitting unit 411 and light receiving unit 412 of the distance detection sensor module 400 and a part (e.g., body tube member) of the camera module 500, protruding or exposed from the first opening 301 of the first support member 311. According to an embodiment, the second opening 331 may be formed at a position corresponding to the distance detection sensor module 400. According to an embodiment, the third opening 332 may be formed at a position corresponding to a part (e.g., body tube member) of the camera module 500. In an embodiment, the second opening 331 and the third opening 332 may be integrally formed.

According to various embodiments, the front plate 320 may include a first exposure region (e.g., first exposure region 3211 in FIG. 3) disposed at a position facing the second opening 331, and a second exposure region (e.g., second exposure region 3212 in FIG. 3) disposed at a position facing the third opening 332. According to an embodiment, the first exposure region 3211 and the second exposure region 3212 may be formed through a print region (e.g., print region 321 in FIG. 3) disposed on the rear surface of the front plate 320.

According to various embodiments, the distance detection sensor module 400 exposed through the first opening 301 of the first support member 311 may be exposed to an external environment of the electronic device 300 through the second opening 331 of the display 330 and the first exposure region (e.g., first exposure region 3211 in FIG. 3) of the front plate 320. According to an embodiment, a part (e.g., body tube member) of the camera module 500 exposed through the first opening 301 of the first support member 311 may be exposed to an external environment of the electronic device 300 through the third opening 332 of the display 330 and the second exposure region (e.g., second exposure region 3212 in FIG. 3) of the front plate 320. According to an embodiment, the distance detection sensor module 400 may be disposed so as to at least partially penetrate the second opening 331 formed in the display 330 and to contact or be close to the rear surface of the front plate 320. According to an embodiment, a part (e.g., body tube member) of the camera module 500 may be disposed so as to at least partially penetrate the third opening 332 formed in the display 330 and to contact or be close to the rear surface of the front plate 320.

As described above, various example embodiments of the disclosure has described a configuration of the camera assembly 1100 that is supported through the first support member 311 and disposed close to the rear surface of the front plate 320 after penetrating through the openings 331 and 332 of the display 330, but they are not limited thereto. For example, only the distance detection sensor module 400 may be disposed to have the same mounting structure in the electronic device 300 using the structure of the opening 331 of the display 320 described above.

According to various embodiments, the distance detection sensor module 400 may be configured to shield noise through a plurality of shielding structures (first shield can 430, second shield can 440, third shield can 414, shielding plate 450, shielding sheets 460 and 461, and/or conductive tape member 470). For example, because the light emitting unit 411 being a main noise source is shielded up to the side thereof through not only the first shield can 430 but also the second shield can 440, electromagnetic interference to other nearby electronic devices can be minimized and/or reduced.

Figure 13:
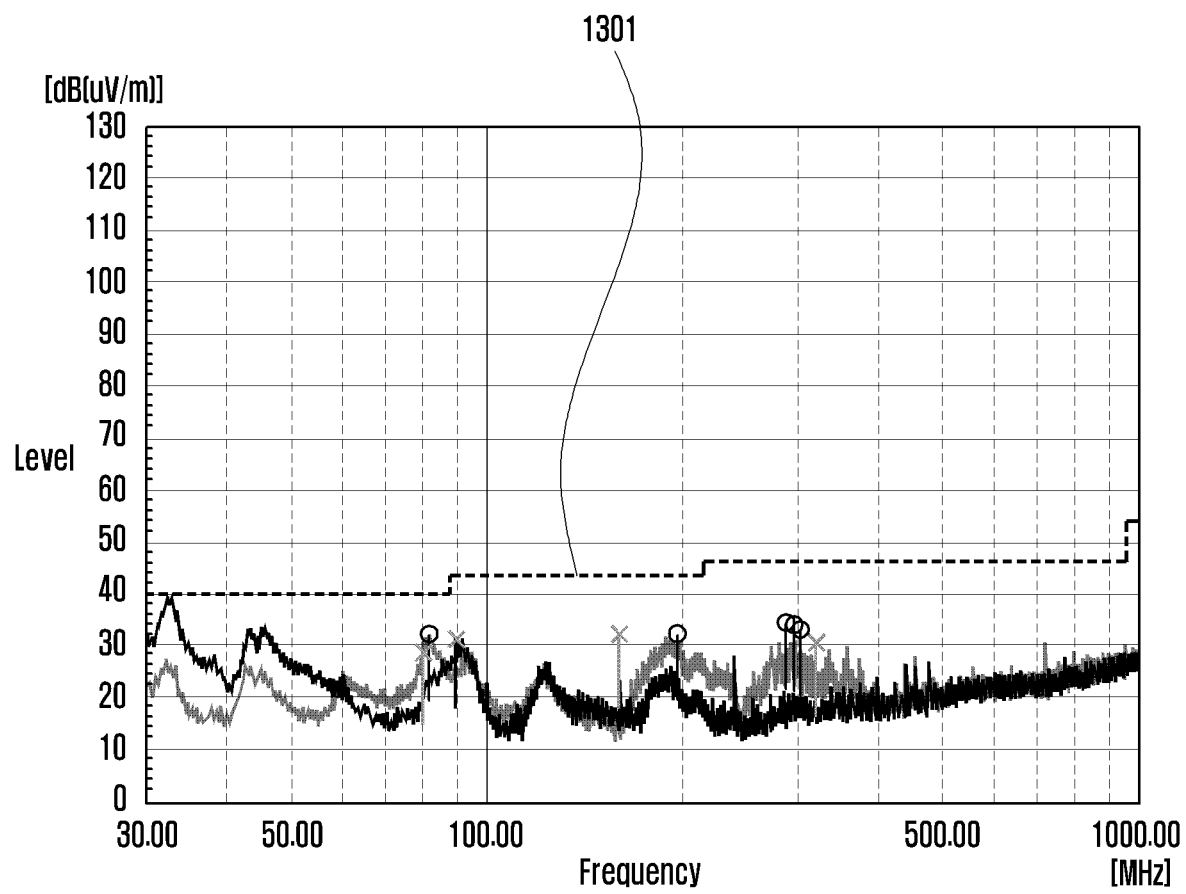
FIG. 13 is an EMI measurement graph of the distance detection sensor module according to various embodiments.

FIG. 13 is an EMI measurement graph of the distance detection sensor module 400 according to various embodiments.

It can be seen that radiated emissions (RE) radiated from the distance detection sensor module (e.g., distance detection sensor module 400 in FIG. 4) including a shielding structure according to various example embodiments Radiated emissions (RE) form a noise spectrum that meets (not exceed) Class B EMI/EMC limits (1301) stipulated by the Federal Communications Commission (FCC).

Figure 14A:
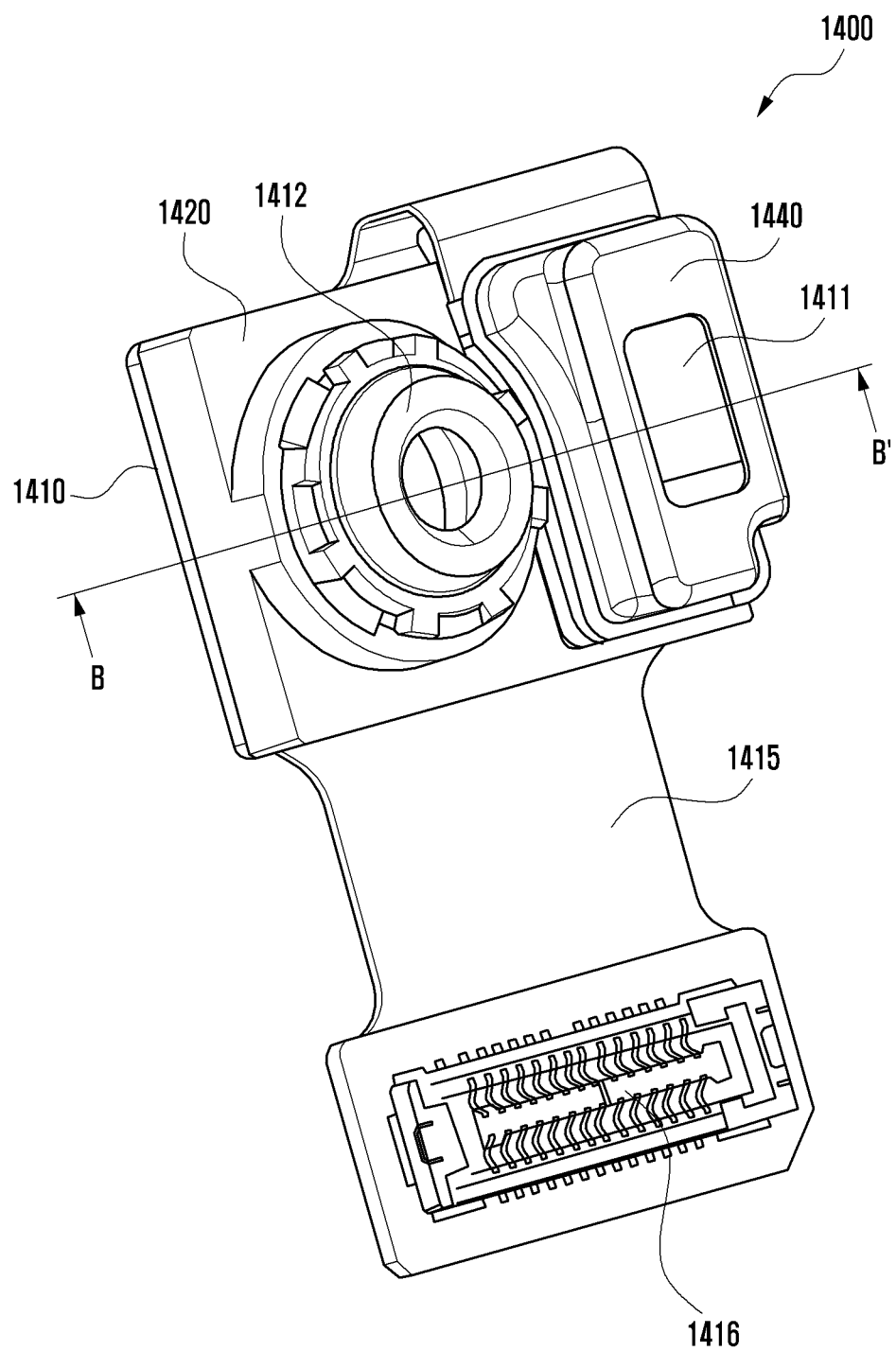
FIG. 14A is a perspective view of the distance detection sensor module according to various embodiments.

FIG. 14A is a perspective view of the distance detection sensor module 1400 according to various embodiments.

Figure 14B:
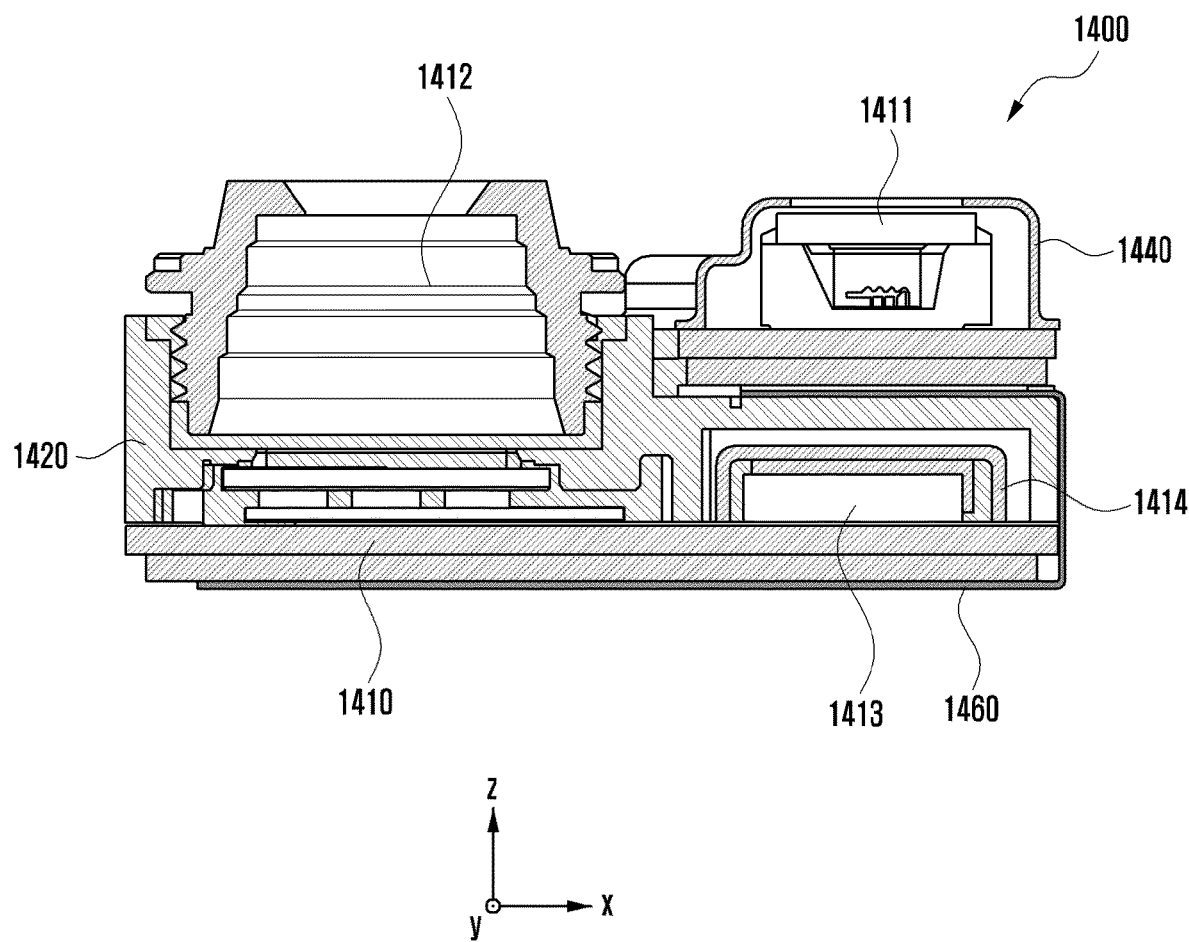
FIG. 14B is a cross-sectional view taken along line B-B' in FIG. 14A according to various embodiments.

FIG. 14B is a cross-sectional view taken along line B-B' in FIG. 14A according to various embodiments.

The distance detection sensor module 1400 of FIGS. 14A and 14B may be at least partially similar to the distance detection sensor module 400 of FIG. 3, or may further include various example embodiments of a distance detection sensor module.

With reference to FIGS. 14A and 14B, the distance detection sensor module 1400 may include a substrate 1410 on which a light emitting unit 1411, a light receiving unit 1412, and a control circuit 1413 are mounted, a holder member (e.g., housing) 1420 (e.g., module housing) coupled with at least a portion of the substrate 1410, and a first shield can 1440 disposed to surround the light emitting unit 1411 that at least partially protrudes or is exposed through the holder member 1420.

According to various embodiments, the substrate 1410 may include a ground layer. According to an embodiment, the substrate 1410 may include a FPCB 1415 that is drawn out to a specific length and includes a connector 1416 for electrically connecting to the main board (e.g., printed circuit board 340 in FIG. 3) of the electronic device (e.g., electronic device 300 in FIG. 3). According to an embodiment, the distance detection sensor module 1400 may include a second shield can 1414 that is mounted to surround the control circuit 1413 mounted on the substrate 1410 and is electrically connected to the ground layer. According to an embodiment, the second shield can 1414 including the control circuit 1413 may be disposed to be protected through the holder member 1420. According to various embodiments, the light emitting unit 1411 may be disposed at a position that at least partially overlaps with the control circuit 1413 when the distance detection sensor module 1400 is viewed from above. According to an embodiment, the light emitting unit 1411 may be stacked in a vertical direction (z-axis direction) with the control circuit 1413. According to an embodiment, the light emitting unit 1411 may be mounted on the surface of the holder member 1420 through an electrical connection member (e.g., FPCB) drawn out from the substrate 1410. According to an embodiment, the first shield can 1440 disposed to surround the light emitting unit 1411 may be electrically connected to the ground layer of the substrate 1410. According to an embodiment, as the first shield can 1410 is formed to be higher than the side of the light emitting unit 1411, a substantially greater part of the light emitting unit 1411 except for the light irradiation region may be shielded.

According to an embodiment, the distance detection sensor module 1400 may include an EMI shielding sheet 1460 that is disposed to cover at least a portion of the holder member 1420 from the rear surface of the substrate 1410.

According to various embodiments, the stacked structure of the control circuit 1413 and the light emitting unit 1411 in the vertical direction (z-axis direction) may be advantageous when the mounting space of the electronic device is insufficient in the x-axis direction and/or y-axis direction.

Figure 15:
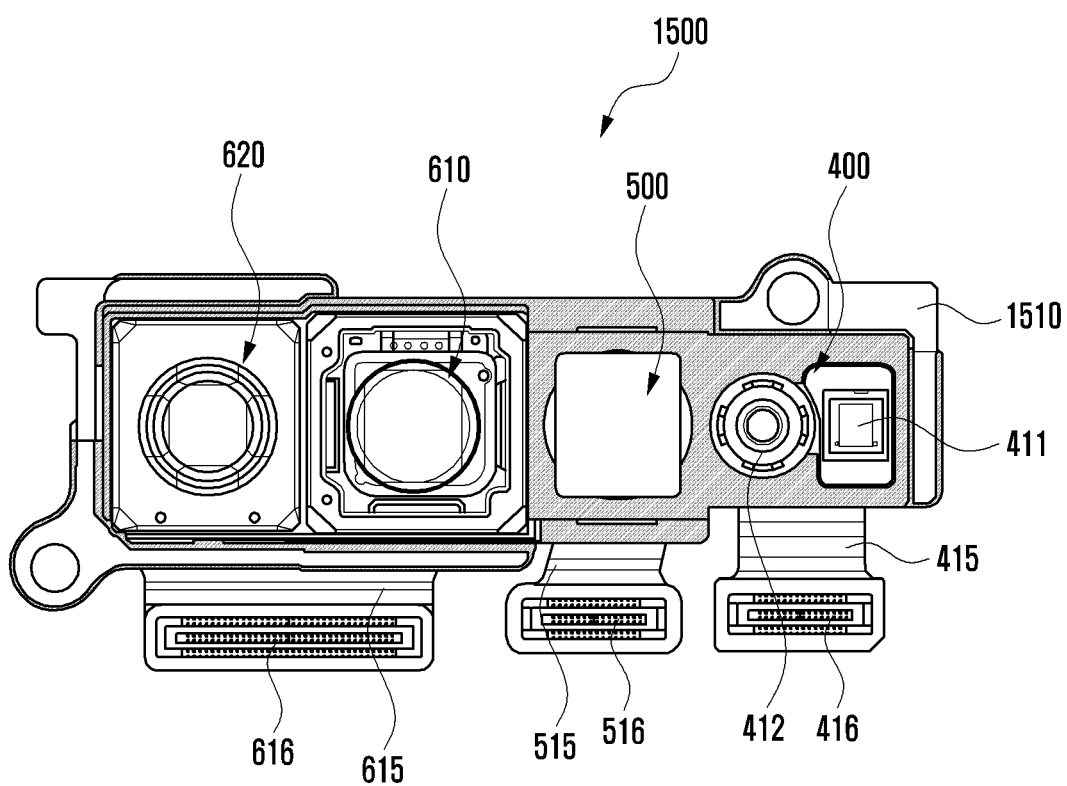
FIG. 15 is a diagram illustrating an example configuration of a camera assembly according to various embodiments.

FIG. 15 is a diagram illustrating an example configuration of a camera assembly 1500 according to various embodiments.

The camera assembly 1500 of FIG. 15 may be at least partially similar to the camera assembly 390 in FIG. 3, or may further include various embodiments of a camera assembly.

With reference to FIG. 15, the camera assembly 1500 including the distance detection sensor module 400 may include a plurality of camera modules 500, 610 and 620 arranged at regular intervals. In this case, the distance detection sensor module 400 and the plural camera modules 500, 610 and 620 may be disposed through a fixing structure of a single bracket 1510.

According to various embodiments, the camera assembly 1500 may include a distance detection sensor module 400, a first camera module 500, a second camera module 610, and a third camera module 620, which are disposed on the single bracket 1510. According to an embodiment, the distance detection sensor module 400 may have substantially the same configuration as the distance detection sensor module 400 having a noise shielding structure described above. According to an embodiment, the camera assembly 1500 may be electrically connected to the main board (e.g., printed circuit board 340 in FIG. 3) of the electronic device (e.g., electronic device 300 in FIG. 3) through a first FPCB 415 (e.g., FPCB 415 in FIG. 4) that is drawn from the distance detection sensor module 400 and includes a first connector 416 at an end thereof. According to an embodiment, the plural camera modules 500, 610 and 620 may also be electrically connected to the main board (e.g., printed circuit board 340 in FIG. 3) of the electronic device (e.g., electronic device 300 in FIG. 3) through a second FPCB 515 and a third FPCB 615 that are drawn from each camera module 500 and/or simultaneously from at least two camera modules 610 and 620 and include a second connector 516 and a third connector 616 at their ends, respectively. According to an embodiment, the plural camera modules 500, 610 and 620 may have various functions, such as a regular photographing function, a wide-angle photographing function, an ultra-wide-angle photographing function, or a telephoto photographing function.

According to various example embodiments, an electronic device (e.g., electronic device 300 in FIG. 3) may include: a housing (e.g., housing 110 in FIG. 1) including a front cover (e.g., front plate 320 in FIG. 3 in FIG. 3), a rear cover (e.g., rear plate 380 in FIG. 3) facing a direction opposite a direction of the front cover, and a side frame (e.g., side member 310 in FIG. 3) surrounding the space between the front cover and the rear cover; and a distance detection sensor module (e.g., distance detection sensor module 400 in FIG. 4) disposed in the space and configured to detect a distance to an external object through the front cover, wherein the distance detection sensor module may include: a substrate (e.g., substrate 410 in FIG. 4) including a light emitting unit including light emitting circuitry (e.g., light emitting unit 411 in FIG. 4), a light receiving unit including light receiving circuitry (e.g., light receiving unit 412 in FIG. 4), a control circuit (e.g., control circuit 413 in FIG. 4), and a ground layer; a module housing (e.g., module housing 420 in FIG. 4) disposed on the substrate; a first shield can (e.g., first shield can 430 in FIG. 4) disposed on the module housing and electrically connected to the ground layer of the substrate; and a second shield can (e.g., second shield can 440 in FIG. 4) disposed on the first shield can surrounding at least a portion of the light emitting unit exposed through the first shield can, and disposed to contact at least a portion of the first shield can.

According to various example embodiments, the electronic device may further include a third shield can (e.g., third shield can 414 in FIG. 4) mounted on the substrate, surrounding the control circuit and electrically connected to the ground layer.

According to various example embodiments, the module housing may include: a first upper surface (e.g., first upper surface 421 in FIG. 4) having substantially a same area as the substrate, and including a first through hole (e.g., first through hole 4201 in FIG. 4) penetrated by a part of the light emitting unit and a second through hole (e.g., second through hole 4202 in FIG. 4) penetrated by a part of the light receiving unit; and a first side surface (e.g., first side surface 422 in FIG. 4) having a specific depth along the rim of the first upper surface, wherein when the module housing is disposed on the substrate, and the light emitting unit, the light receiving unit and the control circuit may be at least partially included in a space defined by the first side surface.

According to various example embodiments, the first shield can may include: a second upper surface (e.g., second upper surface 431 in FIG. 4) having substantially a same area as the first upper surface, and including a third through hole (e.g., third through hole 4301 in FIG. 4) penetrated by a part of the light emitting unit protruding from the first through hole and a fourth through hole (e.g., fourth through hole 4302 in FIG. 4) penetrated by a part of the light receiving unit protruding from the second through hole; and a second side surface (e.g., second side surface 432 in FIG. 4) having a specific depth along the rim of the second upper surface, wherein based on the first shield can being disposed on the module housing, the first shield can may be electrically connected to the ground layer of the substrate.

According to various example embodiments, the second shield can may include: a side wall (e.g., side wall 441 in FIG. 4) including a receiving hole (e.g., receiving hole 4401 in FIG. 4) surrounding a side of the light emitting unit protruding from the third through hole; and at least one flange (e.g., flange 442 in FIG. 4) bent and extended outwardly from the side wall, wherein based on the second shield can being disposed on the first upper surface, the flange may contact the first shield can.

According to various example embodiments, a height of the side wall of the second shield can may be at least equal to or higher than the protruding height of the light emitting unit protruding from the second upper surface.

According to various example embodiments, the side wall may have a closed loop shape or a partially open loop shape along the side of the light emitting unit.

According to various example embodiments, the electronic device may include a conductive shielding plate (e.g., shielding plate 450 in FIG. 4) having substantially a same area as the second upper surface and disposed on the second upper surface, wherein the shielding plate may include a fifth through hole (e.g., fifth through hole 4501 in FIG. 4) penetrated by the side wall of the second shield can protruding from the second upper surface and a sixth through hole (e.g., sixth through hole 4502 in FIG. 4) penetrated by a part of the light receiving unit protruding from the fourth through hole.

According to various example embodiments, the shielding plate may include a plate comprising a polymer material coated with a conductive material on the outer surface.

According to various example embodiments, the shielding plate may comprise a metal material.

According to various example embodiments, the electronic device may further include at least one shielding sheet (e.g., shielding sheets 460 and 461 in FIG. 10A) attached to the distance detection sensor module to cover at least a portion of the shielding plate from the rear surface of the substrate.

According to various example embodiments, the electronic device may further include an alignment structure for arranging the first shield can on the module housing, wherein the arrangement structure may include at least one alignment protrusion (e.g., alignment protrusion 4211 in FIG. 4) protruding from the first upper surface and an alignment through hole (e.g., alignment through hole 4311 in FIG. 4) in the second upper surface at a position corresponding to the alignment protrusion, and wherein the first shield can may be aligned with the module housing so that the alignment protrusion penetrates the alignment through hole.

According to various example embodiments, the alignment protrusion may have a protrusion amount equal to or lower than the second upper surface when penetrating the alignment through hole.

According to various example embodiments, the side frame may further include a conductive support (e.g., first support member 311 in FIG. 12) extending from or coupled to the space of the electronic device and includes a first opening (e.g., first opening 301 in FIG. 12), wherein the distance detection sensor module may be disposed to be supported by the conductive support member between the conductive support member and the rear cover, and wherein the light emitting unit and the light receiving unit may protrude or be exposed toward the front cover through the first opening.

According to various example embodiments, the electronic device may further include a display (e.g., display 330 in FIG. 12) disposed between the conductive support and the front cover to be visible from the outside through at least a portion of the front cover.

According to various example embodiments, the display may include a second opening (e.g., second opening 331 in FIG. 12) at a position facing at least a portion of the first opening, wherein the light emitting unit and/or the light receiving unit may face the front cover through the second opening.

According to various example embodiments, the electronic device may further include a conductive tape (e.g., conductive tape member 470 in FIG. 12) disposed between the conductive support and the distance detection sensor module.

According to various example embodiments, an electronic device (e.g., electronic device 300 in FIG. 3) may include: a housing (e.g., housing 110 in FIG. 1) including a front cover (e.g., front plate 320 in FIG. 3), a rear cover (e.g., rear plate 380 in FIG. 3) a direction opposite a direction of the front cover, and a side frame (e.g., side member 310 in FIG. 3) surrounding a space between the front cover and the rear cover and including a conductive support (e.g., first support member 311 in FIG. 3) extending toward the space and having a first opening (e.g., first opening 301 in FIG. 3) formed therein; a camera assembly (e.g., camera assembly 1100 in FIG. 12) protruding or exposed toward the front cover through the first opening between the conductive support and the rear cover, the camera assembly including a bracket (e.g., bracket 1110 in FIG. 12), a distance detection sensor module (e.g., distance detection sensor module 400 in FIG. 12) disposed on the bracket configured to detect a distance to an external object through the front cover, and at least one camera module (e.g., camera module 500 in FIG. 12) including a camera disposed on the bracket and visible through the front cover; and a display (e.g., display 330 in FIG. 12) disposed between the conductive support and the front cover, wherein the distance detection sensor module may include: a substrate (e.g., substrate 410 in FIG. 12) including a light emitting unit (e.g., light emitting unit 411 in FIG. 12) including light emitting circuitry, a light receiving unit (e.g., light receiving unit 412 in FIG. 12) including light receiving circuitry, a control circuit (e.g., control circuit 413 in FIG. 4), and a ground layer; a module housing (e.g., module housing 420 in FIG. 12) disposed on the substrate; a first shield can (e.g., first shield can 430 in FIG. 12)

disposed on the module housing and electrically connected to the ground layer of the substrate; and a second shield can (e.g., second shield can 440 in FIG. 12) disposed on the first shield can, surrounding at least a portion of the light emitting unit exposed through the first shield can, and disposed to be in contact with at least a portion of the first shield can.

According to various example embodiments, the electronic device may further include a third shield can (e.g., third shield can 414 in FIG. 4) mounted on the substrate, surrounding the control circuit and electrically connected to the ground layer.

According to various example embodiments, the electronic device may further include a conductive shielding plate (e.g., shielding plate 450 in FIG. 12) having substantially a same area as the upper surface of the first shield can and attached thereto.

In addition, the embodiments of the disclosure disclosed above in the present disclosure and drawings are only provided as examples to easily explain the contents of the disclosure for understanding, and are not intended to limit the scope of the embodiments of the disclosure. Therefore, for the scope of the disclosure, it should be construed that all changes or modifications derived from the subject matter of the disclosure in addition to the embodiments disclosed herein are included in the scope of the various embodiments of the disclosure.

Accordingly, while the disclosure has been illustrated and described with reference to various example embodiments, it will the understood that the various example embodiments are intended to be illustrative, not limiting. It will be further understood by those skilled in the art that various changes in form and detail may be made without departing from the true spirit and full scope of the disclosure, including the appended claims and their equivalents.

The invention claimed is:

1. An electronic device comprising:
a housing including a front cover, a rear cover facing a direction opposite a direction of the front cover, and a side frame surrounding a space between the front cover and the rear cover; and
a distance detection sensor module disposed in the space and configured to detect a distance to an external object through the front cover,
wherein the distance detection sensor module comprises:
a substrate including a light emitting unit, a light receiving unit, a control circuit, and a ground layer;
a module housing disposed on the substrate and including a first upper surface;
a first shield can disposed on the module housing and electrically connected to the ground layer of the substrate, the first shield can including a second upper surface;
a second shield can disposed on the first shield can, surrounding at least a portion of the light emitting unit exposed through the first shield can, and disposed to contact at least a portion of the first shield can; and
a shielding plate having the same area as the second upper surface of the first shield can and disposed on the second upper surface,
wherein the shielding plate includes a through hole penetrated by the second shield can protruding from the second upper surface of the first shield can and another through hole penetrated by a part of the light receiving unit protruding through the module housing and the second shield can.

2. The electronic device of claim 1, further comprising a third shield can mounted on the substrate, surrounding the control circuit and electrically connected to the ground layer.

3. The electronic device of claim 1, wherein:
the module housing includes the first upper surface having an area covering the substrate and including a first through hole penetrated by a part of the light emitting unit and a second through hole penetrated by a part of the light receiver, and a first side surface having a specific depth along a rim of the first upper surface; and
based on the module housing being disposed on the substrate, the light emitting unit, the light receiving unit and the control circuit are at least partially included in a space defined by the first side surface.

4. The electronic device of claim 3, wherein:
the first shield can includes the second upper surface having an area covering the first upper surface and including a third through hole penetrated by a part of the light emitting unit protruding from the first through hole and a fourth through hole penetrated by a part of the light receiving unit protruding from the second through hole, and a second side surface having a specific depth along a rim of the second upper surface; and
wherein, when the first shield can is disposed on the module housing, the first shield can is electrically connected to the ground layer of the substrate.

5. The electronic device of claim 4, wherein:
the second shield can includes a side wall including a receiving hole surrounding a side of the light emitting unit protruding from the third through hole, and at least one flange bent and extending outwardly from the side wall; and
wherein, when the second shield can is disposed on the first upper surface, the flange contacts the first shield can.

6. The electronic device of claim 5, wherein a height of the side wall of the second shield can is equal to or higher than a protruding height of the light emitting unit protruding from the second upper surface.

7. The electronic device of claim 5, wherein the side wall has a closed loop shape or a partially open loop shape along the side of the light emitting unit.

8. The electronic device of claim 1, wherein the shielding plate includes a plate comprising a polymer material coated with a conductive material on an outer surface.

9. The electronic device of claim 1, wherein the shielding plate comprises metal material.

10. The electronic device of claim 1, further comprising at least one shielding sheet attached to the distance detection sensor module covering at least a portion of the shielding plate from the rear surface of the substrate.

11. The electronic device of claim 1, wherein:
the side frame further includes a conductive support extending or coupled to the space of the electronic device and including a first opening;
the distance detection sensor module is disposed to be supported by the conductive support between the conductive support and the rear cover; and
the light emitting unit and the light receiving unit protruding or exposed toward the front cover through the first opening.

12. The electronic device of claim 11, further comprising a display disposed between the conductive support and the front cover to be visible from an outside through at least a portion of the front cover.

13. The electronic device of claim 12, wherein:
the display includes a second opening at a position facing at least a portion of the first opening; and
the light emitting unit and/or the light receiving unit face the front cover through the second opening.

14. The electronic device of claim 11, further comprising a conductive tape disposed between the conductive support and the distance detection sensor module.

15. The electronic device of claim 1, further comprising an alignment structure for arranging the first shield can on the module housing, the alignment structure comprises:
at least one alignment protrusion protruding from the first upper surface and
an alignment through hole in the second upper surface at a position corresponding to the alignment protrusion,
wherein the first shield can is aligned with the module housing so that the alignment protrusion penetrates the alignment through hole.

16. The electronic device of claim 15, wherein the alignment protrusion may have a protrusion amount equal to or lower than the second upper surface when penetrating the alignment through hole.

17. An electronic device comprising:
a housing including a front cover, a rear cover facing a direction opposite a direction of the front cover, and a side frame surrounding a space between the front cover and the rear cover and including a conductive support extending toward the space and having a first opening formed therein;
a camera assembly protruding or exposed toward the front cover through the first opening between the conductive support and the rear cover, the camera assembly including a bracket,
a distance detection sensor module disposed on the bracket configured to detect a distance to an external object through the front cover, and at least one camera module including a camera disposed on the bracket and visible through the front cover; and
a display disposed between the conductive support and the front cover,
wherein the distance detection sensor module may include:
a substrate including a light emitting unit, a light receiving unit, a control circuit, and a ground layer;
a module housing disposed on the substrate;
a first shield can disposed on the module housing and electrically connected to the ground layer of the substrate;
a second shield can disposed on the first shield can, surrounding at least a portion of the light emitting unit exposed through the first shield can, and disposed to be in contact with at least a portion of the first shield can; and
a conductive shielding plate having the same area as the upper surface of the first shield can and attached thereto.

18. The electronic device of claim 17, further comprising a third shield can mounted on the substrate, surrounding the control circuit and electrically connected to the ground layer.

* * * * *